US 8,714,078 B2

(12) United States Patent
Ueno et al.

(10) Patent No.: US 8,714,078 B2
(45) Date of Patent: May 6, 2014

(54) APPARATUS FOR SPACING AND ALIGNING PIECES OF FOOD DOUGH

(75) Inventors: Sadao Ueno, Utsunomiya (JP); Hitoshi Kuwabara, Utsunomiya (JP); Nobuo Oshima, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 785 days.

(21) Appl. No.: 12/852,945

(22) Filed: Aug. 9, 2010

(65) Prior Publication Data
US 2011/0036245 A1    Feb. 17, 2011

(30) Foreign Application Priority Data

Aug. 11, 2009  (JP) ................. 2009-186628

(51) Int. Cl.
*A21C 9/04*     (2006.01)
*A21C 9/08*     (2006.01)
*A21C 3/06*     (2006.01)
*A21C 11/10*    (2006.01)

(52) U.S. Cl.
CPC . *A21C 9/085* (2013.01); *A21C 3/06* (2013.01); *A21C 11/10* (2013.01)
USPC .............. 99/450.1; 99/450.2; 198/418.7

(58) Field of Classification Search
USPC ............... 83/24, 27, 102, 104, 109, 110, 166; 99/450.1, 450.2; 198/400, 410, 412, 198/413, 416, 418.7, 459.1, 617; 209/542, 209/544, 545; 425/297, 298, 305.1, 425/319–322, 315–316; 426/500, 501, 503
See application file for complete search history.

(56) References Cited

U.S. PATENT DOCUMENTS

| | | | | |
|---|---|---|---|---|
| 4,375,348 A | | 3/1983 | Costa | |
| 4,546,870 A | * | 10/1985 | Cogo | 198/400 |
| 4,703,679 A | * | 11/1987 | Hayashi et al. | 83/102 |
| 5,142,956 A | * | 9/1992 | Ueno et al. | 83/102 |

(Continued)

FOREIGN PATENT DOCUMENTS

| | | |
|---|---|---|
| AT | 382762 | 5/1985 |
| EP | 0382105 | 2/1990 |

(Continued)

OTHER PUBLICATIONS

Extended European Search Report for corresponding EP application No. 10251421.3, dated Dec. 20, 2013.

*Primary Examiner* — Tu B Hoang
*Assistant Examiner* — Thien S Tran
(74) *Attorney, Agent, or Firm* — Myers Andras LLP; Joseph C. Andras

(57) ABSTRACT

An apparatus for spacing and aligning triangular-like shaped pieces of food dough in one direction, which pieces are arranged so that they form a plurality of columns, wherein the directions of the pieces of the adjacent columns are alternately opposite each other, by rotating the pieces clockwise and counterclockwise at 90 degrees.

The apparatus continues to alternately rotate the pieces 9 clockwise and counterclockwise at 90 degrees, which pieces 9 are cut and separated from a sheet 7 of food dough and are carried sequentially downstream from upstream by conveyors 3, 5, comprising pin-holding members 67 fixed to rotating rods 63, which rods 63 can move vertically and rotate clockwise and counterclockwise at 90 degrees, wherein the pieces 9 can be aligned so that one of the apexes of the triangular-like-shaped pieces 9 is oriented toward the upstream side of the direction for carrying the pieces 9.

6 Claims, 18 Drawing Sheets

(56) References Cited

U.S. PATENT DOCUMENTS

| | | | | |
|---|---|---|---|---|
| 5,169,664 | A | * | 12/1992 | Ueno et al. .................... 426/496 |
| 5,899,316 | A | * | 5/1999 | Ueno et al. .................. 198/418.7 |
| 6,189,677 | B1 | * | 2/2001 | Ruf et al. ...................... 198/411 |
| 6,338,606 | B1 | * | 1/2002 | Bierschenk et al. ........ 414/788.2 |
| 2003/0185927 | A1 | * | 10/2003 | Morikawa et al. ............ 425/363 |

FOREIGN PATENT DOCUMENTS

| | | |
|---|---|---|
| EP | 0482917 | 10/1991 |
| JP | 3009132 | 6/1998 |
| JP | 2007215478 | 8/2007 |

* cited by examiner

US 8,714,078 B2

APPARATUS FOR SPACING AND ALIGNING PIECES OF FOOD DOUGH

RELATED APPLICATIONS

This application claims priority under 35 U.S.C. 119(e) to Japanese Patent Application No. 2009-186628, filed Aug. 11, 2009.

BACKGROUND OF THE INVENTION

1. Technical Field

This invention relates to an apparatus for spacing and aligning triangular-like-shaped pieces of food dough. The apparatus can align the pieces of the food dough in one direction by rotating them at 90 degrees in a clockwise and a counterclockwise direction and by alternately repeating such motions, which pieces are cut and separated from a sheet of food dough and have a triangular-like shape, such as a piece of food dough for a croissant. Particularly, it relates to an apparatus for spacing and aligning triangular-like-shaped pieces of food dough that can rotate them in the alternate directions at a high speed.

2. Background of the Invention

It is well known that pieces of food dough for croissants are made by cutting a sheet of food dough into pieces having isosceles-triangular-like shapes and separating them, which sheet is carried by a belt conveyor. When the pieces of the food dough for croissants are cut and separated from the sheet of the food dough, the sheet is cut so that a column of pieces of food dough is arranged at the direction perpendicular to the direction for carrying the sheet of the food dough. In this case, the direction of the pieces of the food dough of each column is the same. However, the pieces of the food dough of the adjacent column are oriented in the opposite direction.

Namely, as shown in FIG. 1, when one of the apexes of the triangular-like-shaped pieces 9 of odd-numbered columns (columns "A" shown in FIG. 1) is oriented toward one direction (direction "+Y" shown in FIG. 1) perpendicular to the direction for carrying the sheet of the food dough, one of the apexes of the triangular-like-shaped pieces 9 of even-numbered columns (columns "B" shown in FIG. 1) is oriented toward the other direction (direction "−Y" shown in FIG. 1) perpendicular to the direction for carrying the sheet of the food dough. Thus, in order to arrange the pieces 9 so that one of the apexes of the triangular-like-shaped pieces 9 is oriented toward the upstream side (direction "+X" shown in FIG. 1) of the direction for carrying the sheet of the food dough, it is necessary to rotate the pieces 9 of the odd-numbered column (column "A") at 90 degrees clockwise as viewed from above, and to rotate the pieces 9 of the even-numbered column (column "B") at 90 degrees counterclockwise as viewed from above. (See Patent Documents 1, 2, and 3.)

Patent Document 1: Japanese Patent No. 3009132
Patent Document 2: Japanese Patent Laid-open Publication No. 2007-215478
Patent Document 3: U.S. Pat. No. 4,375,348

Below, a conventional apparatus of the prior art is explained.

The conventional apparatus for spacing and aligning pieces of food dough of Patent Document 1 has the constitution shown in FIGS. 1-3. Since the conventional apparatus is well known by one skilled in the art, only the main parts of the apparatus are explained here.

The apparatus 1 for spacing and aligning pieces of food dough comprises an upstream conveyor 3 and a downstream conveyor 5, wherein the speed of the conveyance of the downstream conveyor 5 is greater than that of the upstream conveyor 3, and wherein the upstream conveyor 3 and the downstream conveyor 5 are arranged in a line along the direction for carrying the sheet 7 of the food dough (direction "X" shown in FIG. 1). The upstream conveyor 3 carries the sheet 7 of the food dough to the downstream conveyor 5. As shown in FIG. 1, the sheet 7 of the food dough is cut in pieces 9 having isosceles-triangular-like shapes, which pieces 9 are arranged with a plurality of columns and a plurality of rows and laid side-by-side, while the sheet 7 is carried by the upstream conveyor 3.

When each column of the pieces 9 (columns "A" and "B" shown in FIG. 1) is transferred from the upstream conveyor 3 to the downstream conveyor 5, since the speed of the downstream conveyor 5 is greater than that of the upstream conveyor 3, the pieces 9 of the columns "A" and those of the columns "B" are separated in the direction for carrying the pieces 9 so as to keep a predetermined distance between the pieces 9 of the columns "A" and those of the columns "B." The pieces 9 of the column that is transferred onto the downstream conveyor 5 are rearranged so that, for example, odd-numbered rows (rows "C" shown in FIG. 1) of the pieces 9 go ahead of even-numbered rows (rows "D" shown in FIG. 1) of the pieces 9. Namely, the odd-numbered rows (rows "C") of the pieces 9 and the even-numbered rows (rows "D") of the pieces 9 are rearranged in a staggered pattern. Further, simultaneously, the pieces 9 of the odd-numbered rows and the even-numbered rows are rotated at 90 degrees so that one of the apexes of the triangular-like-shaped pieces 9 is oriented toward the upstream side (direction "+X" shown in FIG. 1) of the direction for carrying the pieces 9.

Incidentally, it is obvious from FIG. 1 that since the pieces 9 in columns "A" and those in columns "B," which are laid side-by-side, are oriented toward the opposite direction from each other, if the pieces 9 in columns "A" are rotated at 90 degrees clockwise as viewed from above, the pieces 9 in columns "B" need to be rotated at 90 degrees counterclockwise as viewed from above, for example.

A means 11 for rearranging pieces in a staggered pattern and rotating the pieces is disposed over the position near the downstream end of the upstream conveyor 3 and the upstream end of the downstream conveyor 5. The means 11 are used for rearranging the pieces 9 of the food dough in a staggered pattern and simultaneously rotating the pieces 9 at 90 degrees clockwise or counterclockwise as viewed from above so that one of the apexes of the triangular-like-shaped pieces 9 is oriented toward the upstream side (direction "+X" shown in FIG. 1) of the direction for carrying the pieces 9, when the pieces 9 of each column are transferred from the upstream conveyor 3 to the downstream conveyor 5.

The means 11, for example, comprises a plurality of upstream rotating means 39A for rotating the pieces 9 of the odd-numbered rows (rows "C") and a plurality of downstream rotating means 39B for rotating the pieces 9 of the even-numbered rows (rows "D").

Below, the upstream means 39A and the downstream means 39B are explained.

Frames 13A, 13B having a box-like shape are disposed at each end of the area in the direction "Y," which located near the point for connecting the upstream conveyor 3 and the downstream conveyor 5. Rotating axes 15A, 15B extending in the direction "X" are rotatably supported by means of a bracket 17 in the frames 13A, 13B, respectively. Cylindrical cams 19A, 19B are fixed to the rotating axes 15A, 15B, respectively. Further, disk-like cams 21A, 21B are fixed to the rotating axes 15A, 15B at the position apart from the end surfaces of cylindrical cams 19A, 19B, respectively. To achieve the synchronized rotation of the rotating axes 15A, 15B, bevel gears are disposed at the ends of the rotating axes 15A, 15B, respectively, which gears are engaged with the bevel gears fixed to an intermediate shaft 25 driven by a motor 23.

Based on the structure explained in the above paragraph, the rotation of the cylindrical cams 19A, 19B and the disk-like cams 21A, 21B, which are disposed at the side end of the conveyors in the direction "Y," can be synchronized with each other. The cylindrical cams 19A, 19B have the same structure, and have grooves 27A, 27B at their peripheral surface. The grooves 27A, 27B (not shown in the cylindrical cam 19A) substantially form a W-like shape (if the cylindrical cams is unrolled) having an identical phase.

Incidentally, for the grooves 27A, 27B of the cylindrical cams 19A, 19B, the strokes in the direction "X" of the grooves 27A disposed at the upstream side (the direction "+X" in FIG. 1) of the cylindrical cams 19A, 19B are less than those of the grooves 27B disposed at the downstream side (the direction "–X" in FIG. 1) of the cylindrical cams 19A, 19B.

Thus, the cam followers 33, 35 that are engaged with the grooves 27A, 27B of the cylindrical cams 19A, 19B, respectively, make two round trips while the cylindrical cams 19A, 19B are rotated one revolution. Further, the stroke of the cam followers 35 in the direction "X," which followers 35 are engaged with the grooves 27B located at the downstream side, is greater than that of the cam followers 33 in the direction "X," which followers 33 are engaged with the grooves 27A located at the upstream side.

An upstream-moving beam 29 and a downstream-moving beam 31 are disposed above the upstream and downstream conveyors 3, 5 and can freely move in the direction "X," which beams 29, 31 extend in the direction "Y." The cam followers 33, 35, which are fixed to both ends of the upstream and the downstream-moving beam 29, 31, in the direction "Y," respectively, are engaged with the grooves 27A, 27B of the cylindrical cams 19A, 19B.

The upstream and the downstream-moving beam 29, 31 are disposed on guiding members 37A, 37B (see FIG. 2), which are fixed to the frames 13A, 13B and extend in the direction "X," and can freely move in the direction "X."

Thus, when the cylindrical cams 19A, 19B are rotated, the upstream and the downstream-moving beam 29, 31 reciprocate in the direction "X" by means of the grooves 27A, 27B.

The plurality of upstream rotating means 39A, which rotate the pieces 9 of the odd-numbered rows (rows "C") cut from the sheet 7 of the food dough, are disposed at the upstream-moving beam 29 with regular intervals in the direction "Y" and protrude toward the downstream side of the upstream-moving beam 29. Further, the plurality of downstream rotating means 39B, which rotate the pieces 9 of the even-numbered rows (rows "D"), are disposed at the downstream-moving beam 31 with regular intervals in the direction "Y" and protrude toward the upstream side of the downstream-moving beam 31. As shown in FIG. 1, at the time for starting the apparatus, the plurality of upstream rotating means 39A disposed at the upstream-moving beam 29 and the plurality of downstream rotating means 39B disposed at the downstream-moving beam 31 are aligned in the direction "Y." Since the upstream and the downstream rotating means 39A, 39B have the same structure and are symmetrically placed so that they are opposed to each other, only the downstream rotating means 39B are explained below. Namely, an explanation of the upstream rotating means 39A is omitted.

As shown in FIG. 3, the downstream rotating means 39B comprises a supporting bracket 41 disposed at the downstream-moving beam 31 so that the position of the supporting bracket 41 in the direction "Y" can be adjusted, and a hollow rotating shaft 43 that is vertically and rotatably disposed at the supporting bracket 41. An ejector plate 47 is fixed to the lower end of the hollow rotating shaft 43 by means of a bracket 45. To rotate the hollow rotating shaft 43, a male thread 49 is formed at the external surface of the hollow rotating shaft 43, and the male thread 49 is engaged with a female thread formed in a screw member 51. Namely, the screw member 51 can freely ascend and descend along the hollow rotating shaft 43.

Thus, if the screw member 51 ascends or descends along the hollow rotating shaft 43, the shaft 43 is rotated clockwise or counterclockwise as viewed from above.

An ascending and descending beam 53 is disposed at the apparatus for lifting and lowering the screw member 51 so that the beam 53 can move upward and downward. The ascending and descending beam 53 has a supporting member 55 for holding the screw member 51 in an integrated fashion. The position of the supporting member 55 on the ascending and descending beam 53 is adjustable. In order to smoothly move the screw member 51 upward and downward along the hollow rotating shaft 43, the support member 55 has a rod 57 horizontally extending in the direction "X." The distal end of the rod 57 is inserted within a slit, which is formed at a bracket 61 disposed at another ascending and descending beam 59 and which has a U-like shape so that the rods can freely move in the direction "X".

The ascending and descending beam 59 holds the supporting member (not shown) for holding the screw member of the upstream rotating means 39A. Namely, the ascending and descending beam 59 corresponds to the ascending and descending beam 53 of the downstream rotating means 39B.

A rotating rod 63 is inserted within the hollow rotating shaft 43 so that the rotating rod can freely move upward and downward and can rotate together with the hollow rotating shaft 43. A pin-holding member 67 is fixed to the lower end of the rotating rod 63 in an integrated fashion. The pin-holding member 67 has a plurality of pins 65, which can stick the pieces 9 of the food dough. The upper end of the rotating rod 63 is fixed to an ascending and descending member 69 for moving the rotating rod 63 upward and downward. The ascending and descending member 69 is attached to an up-and-down-moving beam 71 extending in the direction "Y" so that the position of the ascending and descending member 69 in the direction "Y" can be adjustable.

Thus, by moving the up-and-down-moving beam 71 upward and downward, the pins 65 of the pin-holding member 67 can stick a piece 9 of food dough. Further, by moving the ascending and descending beam 53 upward and downward while the pins 65 stick the piece 9 of the food dough, since both the hollow rotating shaft 43 and the rotating rod 63 can be clockwise or counterclockwise rotated, the pieces 9 of the food dough can be rotated clockwise or counterclockwise as viewed from above. Thus, the pieces 9 of each column (columns "A" and "B") that are cut from the sheet of the food dough 7 can be rotated so that one of the apexes of the triangular-like-shaped pieces 9 is oriented toward the upstream side (direction "+X" shown in FIG. 1) of the direction for carrying the sheet 7.

The ascending and descending beam 53 can move in the direction "X" together with the downstream-moving beam 31 by means of the hollow rotating shaft 43 and the supporting member 55. The ascending and descending beams 53, 59 can also ascend and descend in response to the positions of the upstream-moving beam 29 and the downstream-moving beam 31 in the direction "X."

Below, that mechanism is explained in more detail. Both ends of the ascending and descending beams 53, 59 are supported by supporting shafts 73 (shown in FIG. 2) so that the beams 53, 59 can freely move in the direction "X." The supporting shafts 73 are disposed in each frame 13A, 13B, which are placed at both sides of the apparatus, extend in the direction "X," and can freely move upward and downward. To move the supporting shafts 73 upward and downward, both ends of the respective supporting shafts 73 in the direction "X" are supported by ascending and descending brackets 75. Further, both ends of the respective ascending and descending brackets 75 are rotatably connected to distal ends of swinging links 77, which can freely swing in the vertical plane, by means of supporting links.

The swinging links 77 are supported by swinging arms 81 so that the links 77 can freely move in the longitudinal direction. The swinging arms 81, which can freely swing in the vertical plane, are rotatably supported by protruding members 79 fixed to the frames 13A, 13B. A cam follower 83 is disposed at the intermediate portion of each swinging link 77. The respective cam followers 83 are engaged with the grooves (not shown) disposed at one side surface of the disk-like cams 21A, 21B. Thus, when the disk-like cams 21A, 21B rotate together with the cylindrical cams 19A, 19B, since the swinging links 77 swing in the vertical plane, the supporting shafts 73 are moved upward and downward. Thus, the ascending and descending beams 53, 59 ascend and descend in response to the positions of the upstream and downstream-moving beam 29, 31 in the direction "X."

The up-and-down-moving beams 71, 71A of the downstream and the upstream rotating means 39B, 39A move together with the downstream and the upstream-moving beam 31, 29 in the direction "X," respectively. Further, the up-and-down-moving beams 71, 71A move upward and downward in response to the positions of the upstream and the downstream-moving beam 29, 31 in the direction "X." Namely, both ends of the up-and-down-moving beams 71, 71A in the direction "Y" are connected to supporting shafts 84 (shown in FIG. 2) so that the beams 71, 71A can freely move in the direction "X." The respective supporting shafts 84 extend in the direction "X" and are disposed in the frame 13A, 13B so that the shafts 84 can freely move upward and downward.

Both ends of the respective supporting shafts 84 in the direction "X" are supported by ascending and descending brackets 85. Further, both ends of the respective ascending and descending brackets 85 are rotatably connected to distal ends of swinging links 87, which can freely swing in the vertical plane, by means of supporting links. The swinging links 87 are rotatably supported by protruding members 89 fixed to the frames 13A, 13B. A cam follower 91 is disposed at the intermediate portion of each swinging link 87. The respective cam followers 91 are engaged with the grooves (not shown) disposed at the other side surface of the disk-like cams 21A, 21B. Thus, when the disk-like cams 21A, 21B rotate together with the cylindrical cams 19A, 19B, since the up-and-down-moving beams 71, 71A move upward and downward by means of the swinging links 87, the rotating rods 63 of the upstream and the downstream rotating means 39A, 39B are moved upward and downward. Thus, the rotating rods 63 ascend and descend in response to the positions of the upstream and the downstream-moving beam 29, 31 in the direction "X."

Below, the operation of the conventional apparatus 1 for spacing and aligning pieces of food dough, which has the configuration explained in the above paragraphs, is explained based on FIGS. 1-3 and 11.

FIG. 11 shows a diagram of a time-chart for explaining the movement of the main parts of the conventional apparatus 1 for spacing and aligning the pieces of the food dough. In FIG. 11, (1) the movement of the upstream-moving beam 29 in the direction "X," (2) the movement of the downstream-moving beam 31 in the direction "X," (3) the angle of the rotation of the pin-holding member 67, and (4) the vertical movement of the pin-holding member 67, are shown as a function of the angles of the rotation of the cylindrical cams 19A, 19B and the disk-like cams 21A, 21B.

At the time for starting the apparatus (this means that the angles of the rotation of the cylindrical cams 19A, 19B and the disk-like cams 21A, 21B are "0" degree), as shown in FIG. 1, the upstream rotating means 39A and the downstream rotating means 39B are aligned in the direction "Y." When the rotating axes 15A, 15B start to rotate by means of the motor 23, the up-and-down-moving beams 71, 71A begin to descend from the position at the upper end, and then the pins 65 of the pin-holding member 67 stick the pieces 9 of the food dough of the column "A" that are aligned in the direction "Y," just before the pieces 9 of the food dough of the column "A" are transferred from the upstream conveyor 3 to the downstream conveyor 5. Namely, as shown in FIG. 11, the pin-holding members 67 descend from the position at the upper end to the position at the lower end. When the rotating axes 15A, 15B further rotate, the upstream-moving beam 29 and the downstream-moving beam 31 gradually move downstream in the direction "X" (left side in FIG. 1) by means of the action of the grooves 27A, 27B formed on the side surface of the cylindrical cams 19A, 19B.

Then, since the inclination of the grooves 27A differs from that of the grooves 27B, the downstream-moving beam 31 moves downstream faster than the upstream-moving beam 29. Namely, as shown in FIG. 11, the stroke of the movement of the downstream-moving beam 31 in the direction "X" is greater than that of the upstream-moving beam 29. Thus, the pieces 9 of the food dough that are aligned in the direction "Y" are placed on the downstream conveyor 5 in a staggered pattern. Further, as explained in the above paragraph, when the upstream and the downstream-moving beam 29, 31 move downstream, since the ascending and descending beams 53, 59 ascend from the position at the lower end to the middle position at the vertical stroke of the beams 53, 59, the hollow rotating shafts 43 and the rotating rods 63 rotate clockwise. Thus, the pieces 9 of the food dough also rotate clockwise (namely, the rotating axes 15A, 15B rotate for ¼ revolution). Namely, the pieces 9 of the food dough that are transferred to the downstream conveyor 5 are rearranged in a staggered pattern. Simultaneously, the pieces 9 of the food dough are aligned so that one of the apexes of the triangular-like-shaped pieces 9 is oriented toward the upstream side (direction "+X" shown in FIG. 1) of the direction for carrying the pieces 9. At that time, as shown in FIG. 11, the pin-holding members 67, which are disposed on the upstream and downstream-moving beam 29, 31, rotate the pieces 9 clockwise at 90 degrees as viewed from above, while the pin-holding members 67 rotate from the position at "−90" degrees to the position at "0" degree (middle position).

Then, when the rotating axes 15A, 15B are further rotated, the rotating rods 63 ascend, and simultaneously the upstream and downstream-moving beams 29, 31 return to the initial position. Namely, the apparatus 1 is ready for handling the pieces 9 of the food dough of the column "B" adjacent to the column "A." The directions of the pieces 9 in column "B" are opposite to those of the pieces 9 in column "B." Thus, when the upstream and downstream-moving beams 29, 31 return to the initial position, the ascending and descending beams 53, 59 further ascend so that the beams 53, 59 move from the middle position to the upper end position. Thus, the rotating rods 63 are rotated clockwise to 180 degrees as viewed from above (namely, the rotating axes 15A, 15B rotate for ⅔ revolution). At that time, as shown in FIG. 11, the pin-holding members 67, which are disposed on the upstream and downstream-moving beam 29, 31, rotate clockwise from the position at "0" degree (middle position) to the position at "+90" degrees as viewed from above, while the pin-holding members 67 do not hold the pieces 9.

Next, when the rotating axes 15A, 15B are further rotated, the upstream and downstream-moving beams 29, 31 and the up-and-down-moving beams 71, 71A are moved as explained in the above paragraphs. Thus, the pieces 9 of the food dough of the column "B" are rearranged on the downstream conveyor 5 in a staggered pattern. At that time, the ascending and descending beams 53, 59 descend from the upper end position to the middle position. Thus, since the rotating rods 63 rotate counterclockwise as viewed from above, the pieces 9 are also rotated counterclockwise at 90 degrees, which are the opposite directions during the operations explained in the above paragraphs. Consequently, the pieces 9 of the food dough that are transferred to the downstream conveyor and are rearranged in a staggered pattern are aligned so that one of the apexes of the triangular-like-shaped pieces 9 is oriented toward the upstream side (direction "+X" shown in FIG. 1) of the direction for carrying the pieces 9 (namely, the rotating axes 15A, 15B rotate for ¾ revolution). At that time, as shown in FIG. 11, the pin-holding members 67, which are disposed on the upstream and downstream-moving beams 29, 31, rotate the pieces 9 counterclockwise at 90 degrees as viewed from above, while the pin-holding members 67 rotate from the position at "+90" degrees to the position at "0" degree (middle position).

Then, when the rotating axes 15A, 15B are further rotated, namely, when they rotate one revolution, all elements return to the initial positions. At that time, as shown in FIG. 11, the pin-holding members 67, which are disposed on the upstream and downstream-moving beam 29, 31, rotate counterclockwise from the position at "0" degree (middle position) to the position at "−90" degrees as viewed from above, while the pin-holding members 67 do not hold the pieces 9.

The plurality of pins 65 of the pin-holding members 67 of the upstream and the downstream rotating means 39A, 39B of the conventional apparatus 1 are arranged within the area having a triangular-like-shape corresponding to the triangular-like-shaped pieces 9. Thus, for example, to rotate counterclockwise as viewed from above the pieces 9 of the column "B" after rotating clockwise the pieces 9 of the column "A" at 90 degrees, it is necessary that the pin-holding members 67 and the rotating rods 63 further be rotated clockwise as viewed from above at 90 degrees so that they are positioned at "+180" degrees. After rotating counterclockwise at 90 degrees the pieces 9, to handle the pieces 9 of the following column "A," it is necessary that the rotating rods 63 further be rotated counterclockwise as viewed from above at 90 degrees so that they are positioned at the "0" degree, which corresponds to the initial position.

Thus, the problem of the conventional apparatus is such that there are many unnecessary movements in the operation of the apparatus. Namely, it is necessary to design the apparatus so that the grooves 27A, 27B of the disk-like cam 21A, 21B have the shapes that can intermittently rotate the pin-holding members 67 among the positions at "−90," "0," "+90," "0," and "−90," degrees, which grooves 27A, 27B are used for moving the ascending and descending beams 53, 59 upward and downward to rotate the rotating rods 63 and the pin-holding members 67. Thus, the problem is such that the shapes of the grooves 27A, 27B are complicated. To rotate the pin-holding members 67 to position them at the respective positions, the ascending and descending beams 53, 59 must move at a high acceleration. Thus, the problem is such that a mechanical vibration is likely to be caused.

Namely, to improve the productivity of the apparatus, if the speed of the operation of the apparatus increases by rotating the rotating axes 15A, 15B at a high speed, a mechanical vibration is likely to be caused, because the shapes of the grooves 27A, 27B are complicated.

When the rotating rods 63 and the pin-holding members 67 are rotated by means of a linear-motion-type actuator, such as an air cylinder, instead of the disk-like cam 21A, 21B, it is necessary to rotate the rotating rods 63 clockwise and counterclockwise among the positions at "−90," "0," and "+90" degrees, and further to precisely determine the positions of the rotating rods 63 with an interval of 90 degrees. Further, to rotate the rotating rods 63, an actuator having a long stroke is required.

Further, when the rotating rods 63 and the pin-holding members 67 are rotated by means of a rotary actuator, it is necessary to rotate the rotating rods 63 clockwise and counterclockwise among the positions at "−90," "0," and "+90" degrees, and, further, to precisely determine the positions of the rotating rods 63 with an interval of 90 degrees.

SUMMARY OF THE INVENTION

This invention was conceived to solve the problems explained in the above paragraphs. The first aspect of the invention has the following technical features:

An apparatus for spacing and aligning triangular-like shaped pieces of food dough in one direction, which pieces are cut and separated from a sheet of food dough so as to form columns, which columns are carried sequentially downstream from upstream by a conveyor, wherein the directions of the pieces of the adjacent columns are alternately opposite each other, the apparatus comprising:

a plurality of first pin-holding members having a plurality of pins for sticking the pieces, a plurality of second pin-holding members having a plurality of pins for sticking the pieces, an upstream-moving beam for holding and fixing the first pin-holding members at the predetermined positions in the direction of the movement of the conveyor, a downstream-moving beam for holding and moving the second pin-holding members downstream from upstream, ascending and descending beams for vertically moving the first and the second pin-holding members, and rotating rods for rotating the first and the second pin-holding members, wherein (1) the ascending and descending beams lower the first and the second pin-holding members to a position at a lower end, (2) next, the downstream-moving beam moves the second pin-holding members from a position at an upstream end to a position at a downstream end, (3) while in operation (2), the rotating rods rotate the first and the second pin-holding members clockwise at 90 degrees, (4) next, the ascending and descending beams lift the first and the second pin-holding members up to a position at an upper end, (5) next, the downstream-moving beam moves the second pin-holding members from the position at the downstream end to the position at the upstream end, (6) next, the ascending and descending beams lower the first and the second pin-holding members to the position at the lower end, (7) next, the downstream-moving beam moves the second pin-holding members from the position at the upstream end to the position at the downstream end, (8) while in operation (7), the rotating rods rotate the first and the second pin-holding members counterclockwise at 90 degrees, (9) next, the ascending and descending beams lift the first and the second pin-holding members up to the position at the upper end, and

(10) next, the downstream-moving beam moves the second pin-holding members from the position at the downstream end to the position at the upstream end, and, further, wherein operations (1)-(10) are repeatedly performed.

The second aspect of the invention has the following technical features:

An apparatus for spacing and aligning triangular-like shaped pieces of food dough in one direction after placing the pieces in a staggered pattern, which pieces are cut and separated from a sheet of food dough so as to form columns, which columns are carried sequentially downstream from upstream by a conveyor, wherein the directions of the pieces of the adjacent columns are alternately opposite each other, the apparatus comprising:

a plurality of pin-holding members having a plurality of pins for sticking the pieces, wherein the plurality of pin-holding members are preliminarily placed in a staggered pattern, ascending and descending beams for vertically moving the pin-holding members, and rotating rods for rotating the pin-holding members, wherein (1) the ascending and descending beams lower the pin-holding members to a position at a lower end, (2) next, the rotating rods rotate the pin-holding members clockwise at 90 degrees, (3) next, the ascending and descending beams lift the pin-holding members up to a position at an upper end, (4) next, the ascending and descending beams lower the pin-holding members to the position at the lower end, (5) next, the rotating rods rotate the pin-holding members counterclockwise at 90 degrees, and (6) next, the ascending and descending beams lift the pin-holding members up to the position at the upper end, and, further, wherein operations (1)-(6) are repeatedly performed.

The third aspect of the invention has the following technical features:

An apparatus for spacing and aligning triangular-like shaped pieces of food dough in one direction after placing the pieces by separating them in the transverse direction of a conveyor, which pieces are cut and separated from a sheet of food dough so as to form columns, which columns are carried sequentially downstream from upstream by the conveyor, wherein the directions of the pieces of the adjacent columns are alternately opposite each other, the apparatus comprising:

a plurality of pin-holding members having a plurality of pins for sticking the pieces, wherein the plurality of pin-holding members are preliminarily placed by separating them in the transverse direction of a conveyor, ascending and descending beams for vertically moving the pin-holding members, and rotating rods for rotating the pin-holding members, wherein (1) the ascending and descending beams lower the pin-holding members to a position at a lower end, (2) next, the rotating rods rotate the pin-holding members clockwise at 90 degrees, (3) next, the ascending and descending beams lift the pin-holding members up to a position at an upper end, (4) next, the ascending and descending beams lower the pin-holding members to the position at the lower end, (5) next, the rotating rods rotate the pin-holding members counterclockwise at 90 degrees, and (6) next, the ascending and descending beams lift the pin-holding members up to the position at the upper end, and, further, wherein operations (1)-(6) are repeatedly performed.

The fourth aspect of the invention has the following technical features:

An apparatus for spacing and aligning triangular-like shaped pieces of food dough in one direction, which pieces are cut and separated from a sheet of food dough so as to form columns, which columns are carried sequentially downstream from upstream by a conveyor, wherein the directions of the pieces of the adjacent columns are alternately opposite each other, the apparatus comprising:

a plurality of first pin-holding members having a plurality of pins for sticking the pieces, a plurality of second pin-holding members having a plurality of pins for sticking the pieces, an upstream-moving beam for holding and moving the first pin-holding members downstream from upstream, a downstream-moving beam for holding and moving the second pin-holding members downstream from upstream, ascending and descending beams for vertically moving the first and the second pin-holding members, and rotating rods for rotating the first and the second pin-holding members, wherein (1) the ascending and descending beams lower the first and the second pin-holding members to a position at a lower end, next, the upstream-moving beam moves the first pin-holding members
from a position at an upstream end to a position at a downstream end, and simultaneously the downstream-moving beam moves the second pin-holding members from a position at an upstream end to a position at a downstream end, (3) while in operation (2), the rotating rods rotate the first and the second pin-holding members clockwise at 90 degrees, (4) next, the ascending and descending beams lift the first and the second pin-holding members up to a position at an upper end, (5) next, the upstream-moving beam moves the first pin-holding members from the position at the downstream end to the position at the upstream end, and simultaneously the downstream-moving beam moves the second pin-holding members from the position at the downstream end to the position at the upstream end, (6) next, the ascending and descending beams lower the first and the second pin-holding members to the position at the lower end, (7) next, the upstream-moving beam moves the first pin-holding members from the position at the upstream end to the position at the downstream end, and simultaneously the downstream-moving beam moves the second pin-holding members from the position at the upstream end to the position at the downstream end, (8) while in operation (7), the rotating rods rotate the first and the second pin-holding members counterclockwise at 90 degrees, (9) next, the ascending and descending beams lift the first and the second pin-holding members up to the position at the upper end, and

(10) next, the upstream-moving beam moves the first pin-holding members from the position at the downstream end to the position at the upstream end, and simultaneously the downstream-moving beam moves the second pin-holding members from the position at the downstream end to the position at the upstream end, and, further, wherein operations (1)-(10) are repeatedly performed.

EFFECTS OF THE INVENTION

By the present inventions, to align the triangular-like shaped pieces of food dough in one direction, wherein the directions of the pieces of the adjacent columns are alternately opposite each other, the plurality of pin-holding members having a plurality of pins for sticking the pieces are alternately rotated clockwise at 90 degrees and counterclockwise at 90 degrees. Thus, the pieces can be aligned so that one of the apexes of the triangular-like-shaped pieces is oriented toward the upstream direction for carrying the pieces. Namely, the rotating rods may rotate just at the range of the angles of "0"-"90" degrees, and be positioned at only the positions at "0" and "90" degrees.

Thus, if the rotating rods are rotated by the grooves formed at the surfaces of the disk-like cams similar to those used for the conventional apparatus, the grooves may be designed so that the rotating rods can rotate just between the positions at "0" and "90" degrees. Thus, the shapes of the grooves can be simplified. Consequently, since the rotational acceleration of the rotating rods, which hold the pin-holding members at their distal ends, can be reduced, a mechanical vibration can be suppressed. Thus, the apparatus for spacing and aligning the pieces of the food dough can be driven at high speed.

Further, when the rotating rods are rotated by means of an actuator, such as an air cylinder or a rotary actuator, for example, since the rotating rods may rotate clockwise and counterclockwise just at the range of the angle of "0"-"90" degrees, and be positioned at only the positions at "0" and "90" degrees, the actuator can be downsized and simplified. Further, the problems explained in the above paragraphs can be resolved.

PREFERRED EMBODIMENT OF THE INVENTION

Below, the embodiments of the present inventions are explained based on figures. The elements that have the same functions as those of the elements of the conventional apparatus have the same denotations, and so the details of the elements are omitted.

Figure 2:
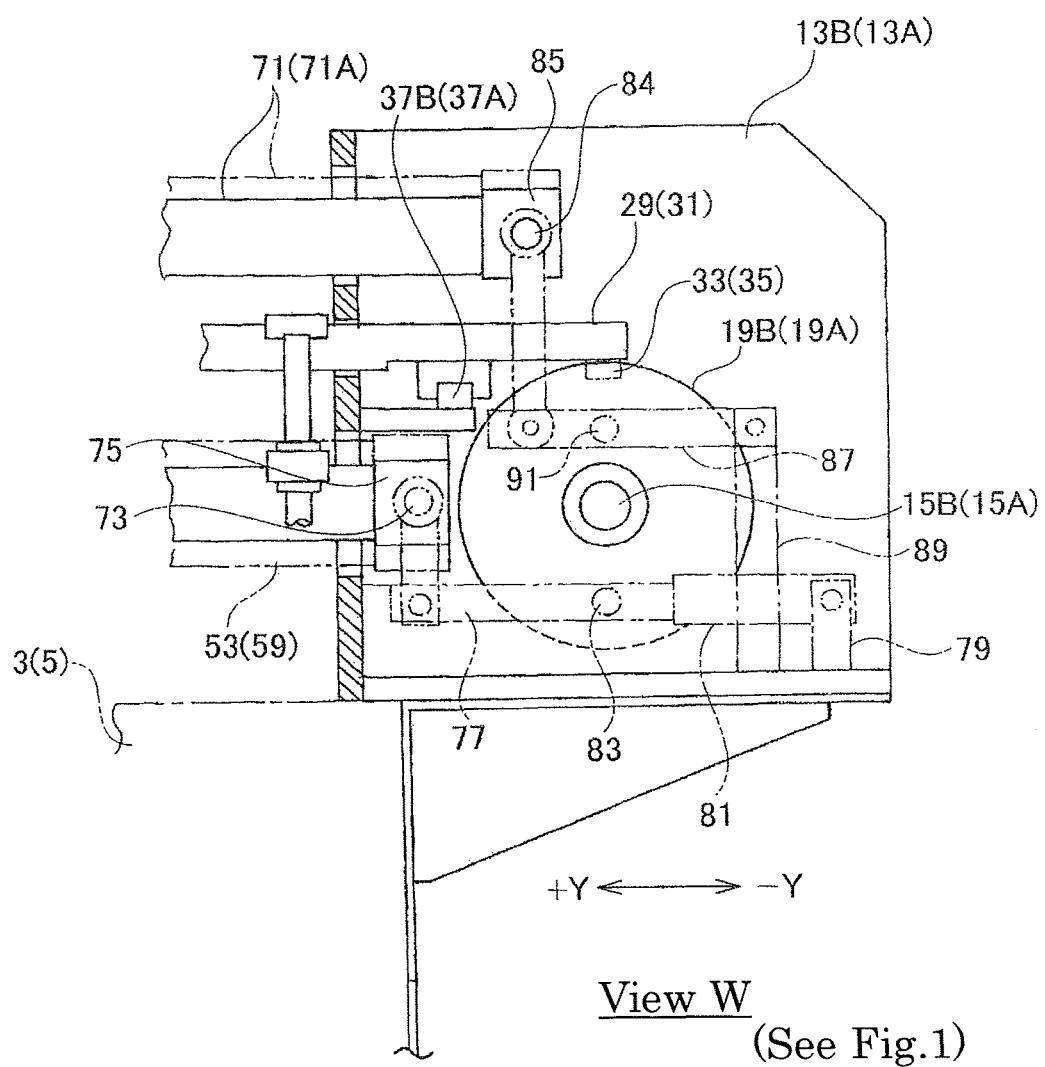
FIG. 2 shows the right side view (View W in FIG. 1) of the cross section of the main part of the apparatus of FIG. 1.
Figure 3:
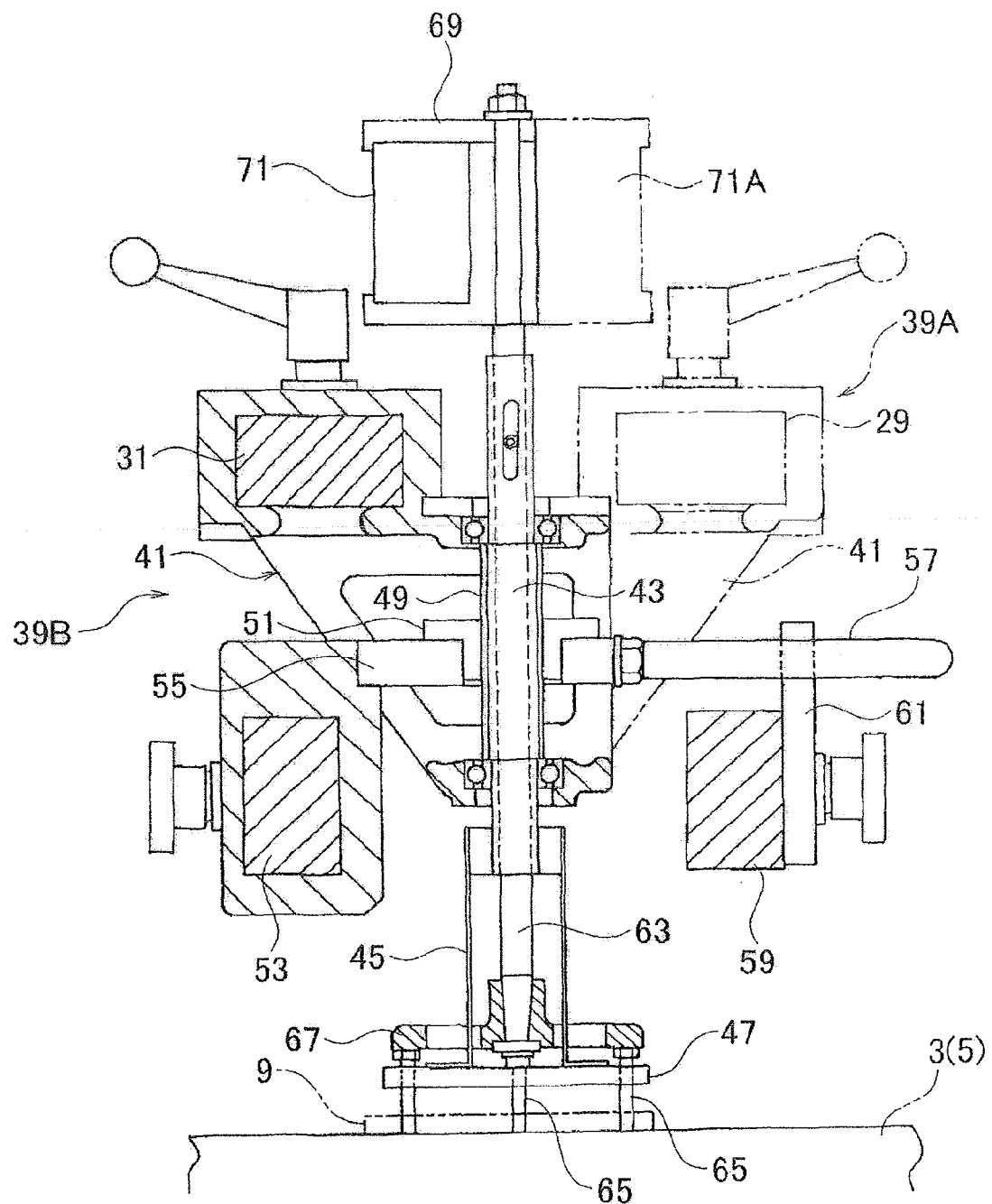
FIG. 3 shows the sectional view of the upstream and the downstream rotating means of the apparatus of FIG. 1.

Thus, for the embodiments of the present inventions explained below, if there is no explanation of the details of the elements, it should be understood that the constitutions of the elements are the same as those of the conventional apparatus shown in FIGS. 1-3 and explained in paragraphs [0005]-[0048].

Below, the definitions of the wording used in this specification are explained.

Figure 5:
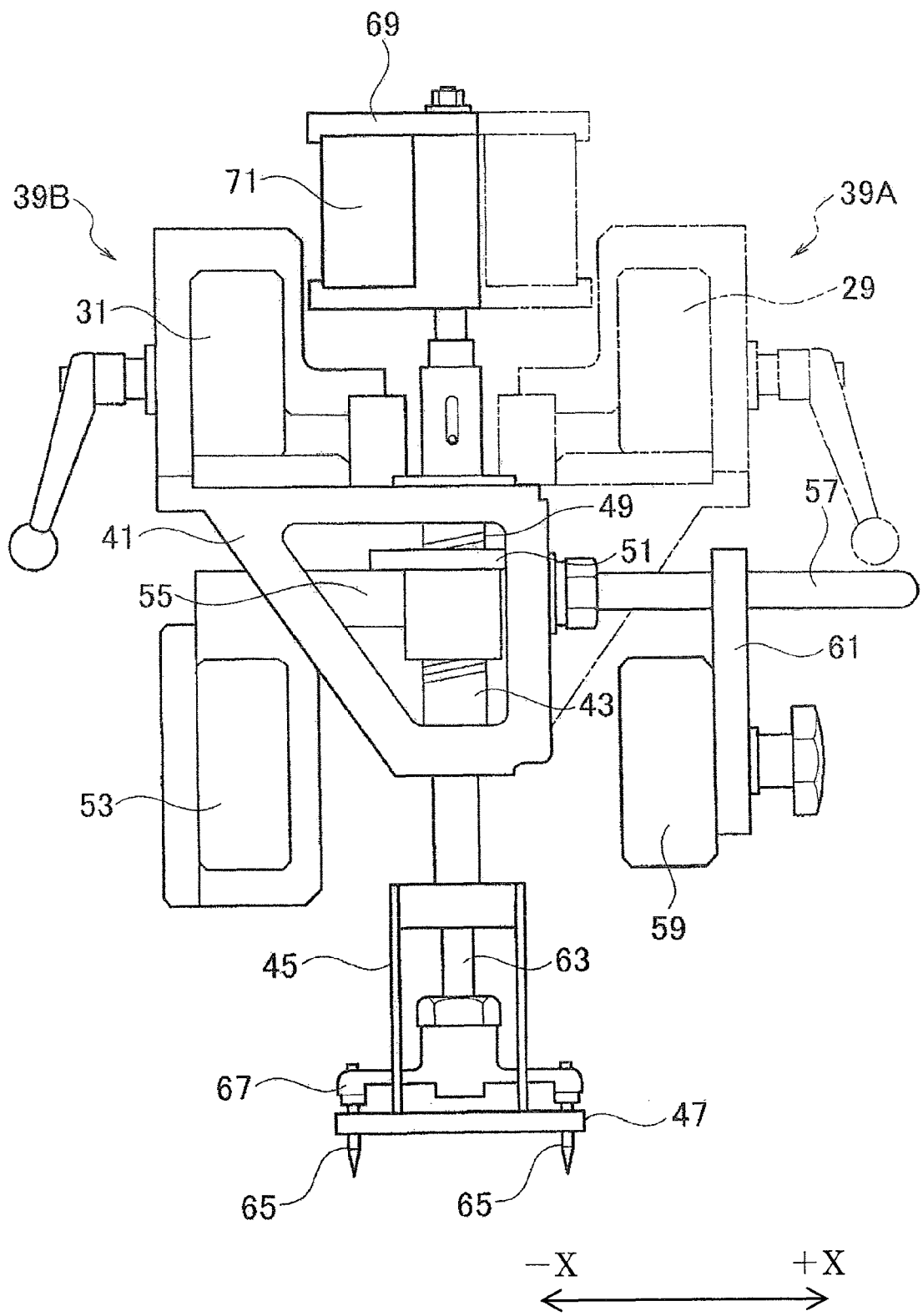
FIG. 5 shows the sectional view of the upstream and the downstream rotating means of the apparatus of FIG. 4.
Figure 6A:
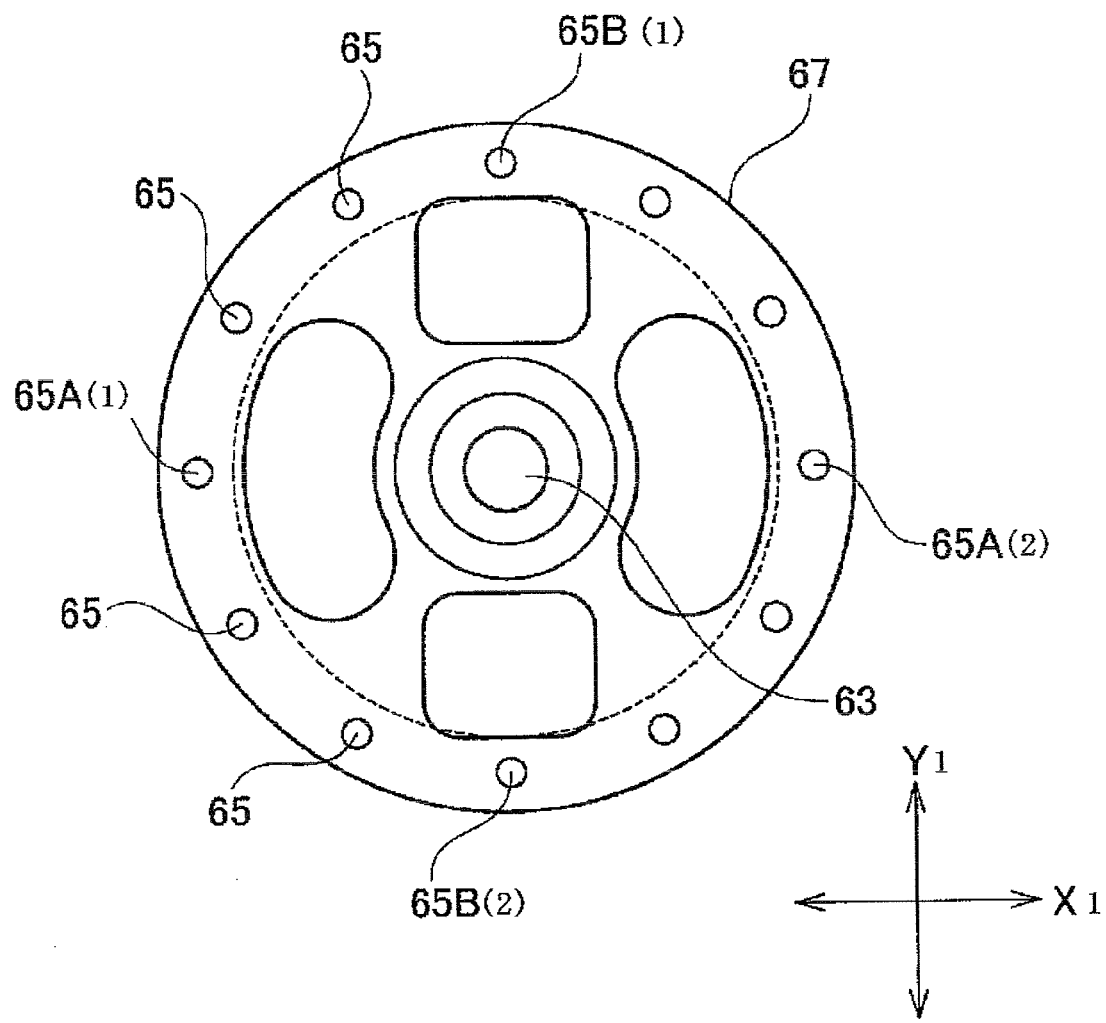
FIGS. 6(*a*)-(*e*) show the view of the pin-holding members to explain the embodiments of the layout of the pins.
Figure 6B:
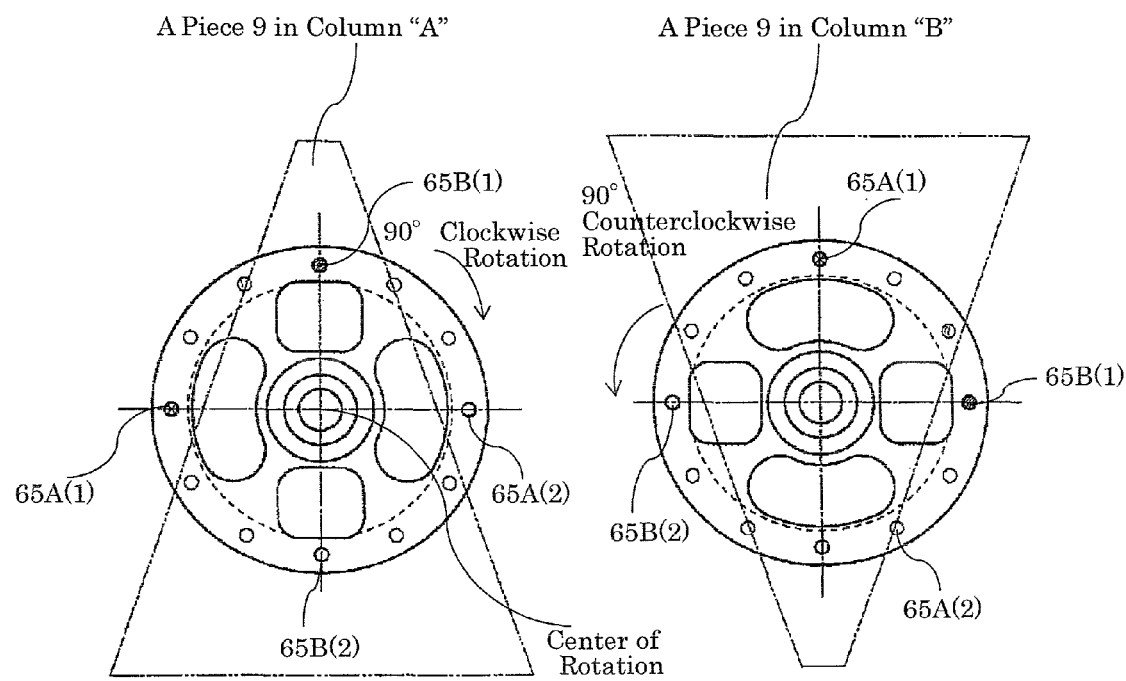
Figure 6C:
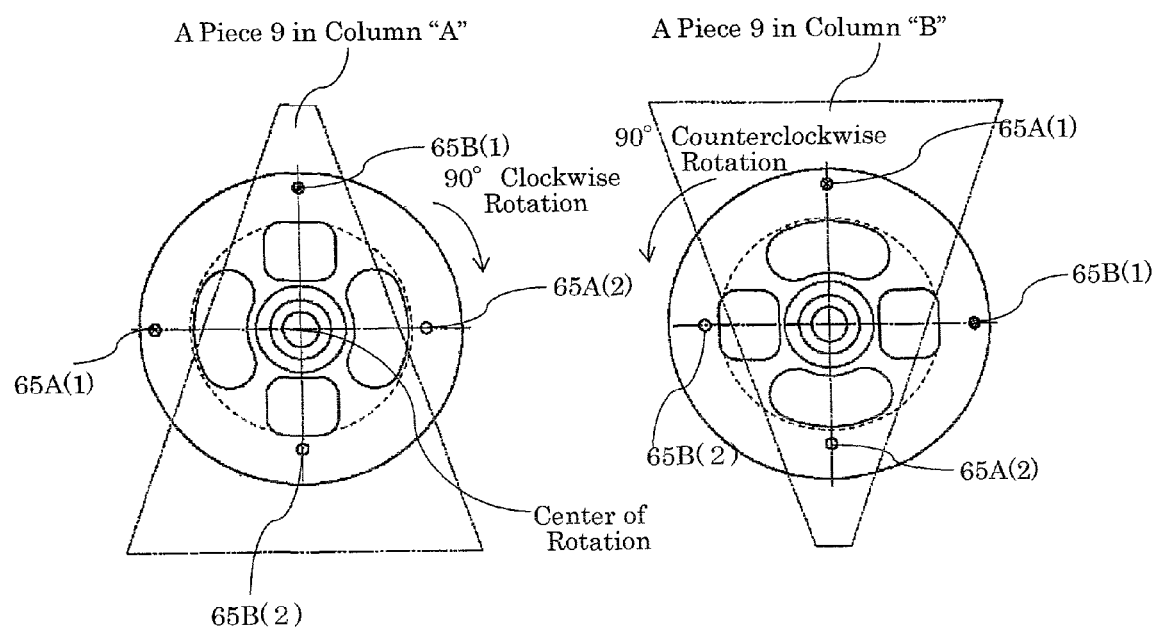
Figure 6D:
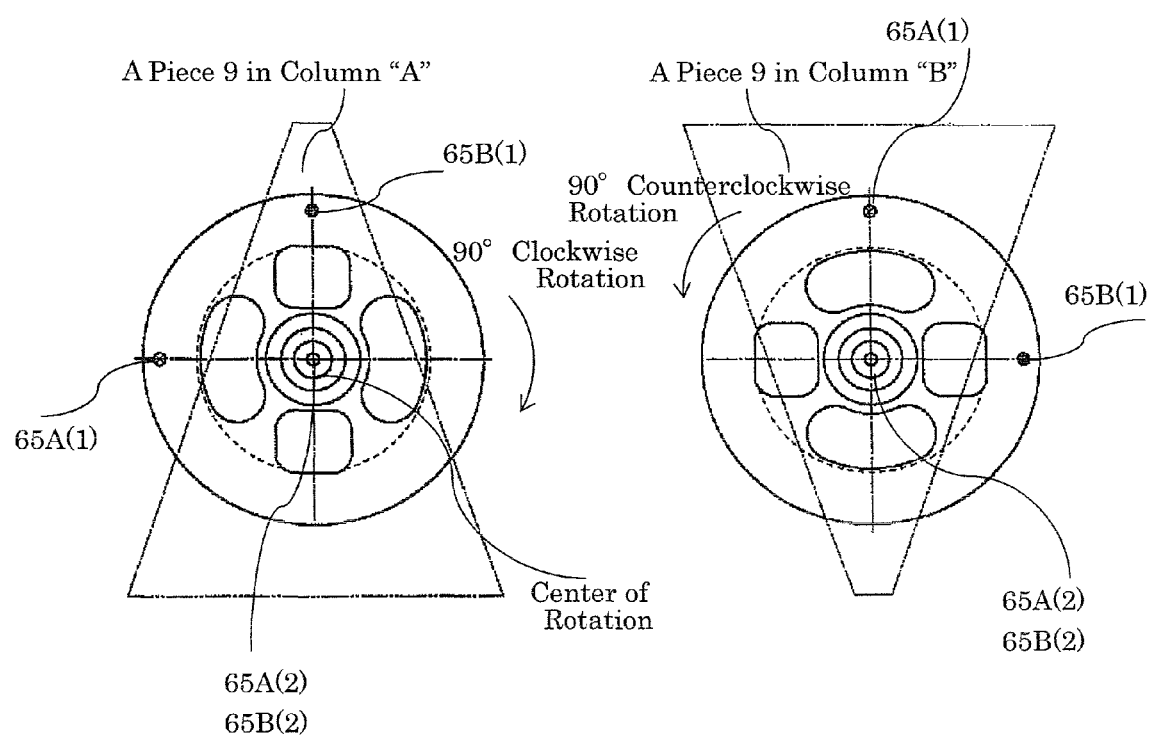
Figure 6E:
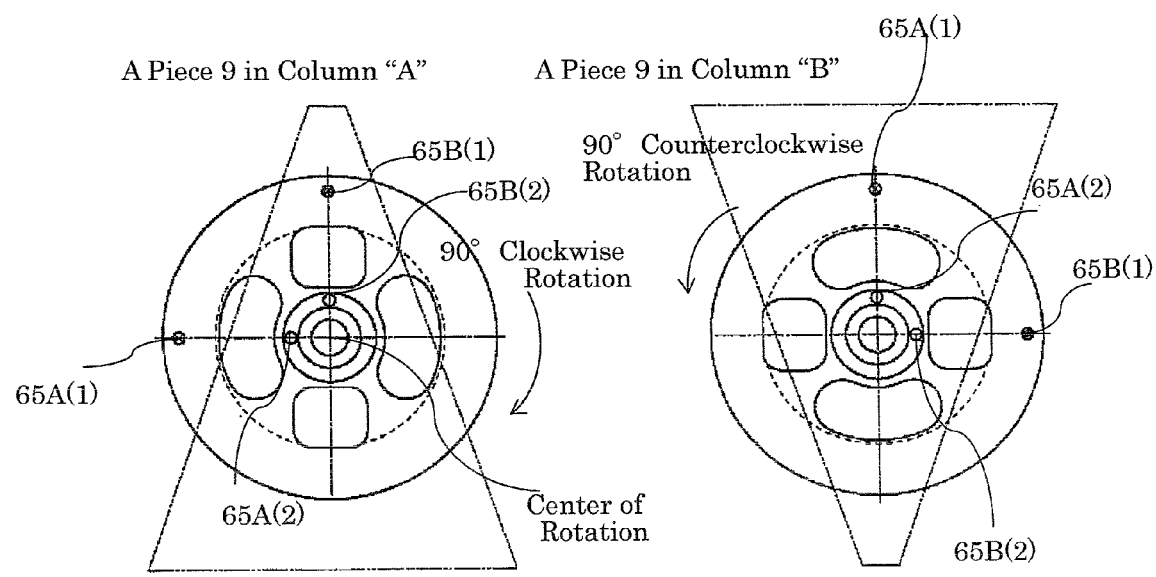
Figure 7:
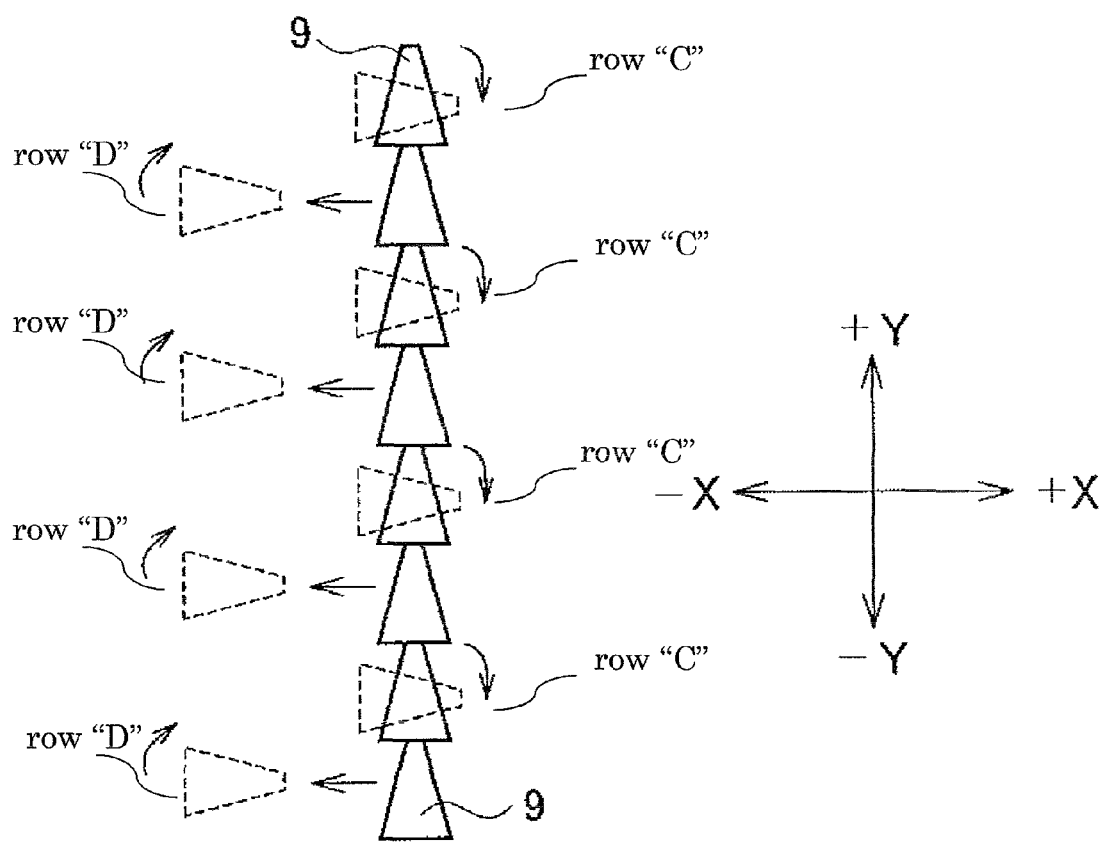
FIG. 7 shows the movements of the pieces of the food dough to rearrange them in a staggered pattern and to rotate them.

1) "to rotate clockwise at 90 degrees" regarding the rotating rods, the pin-holding members, and the pieces means "to rotate clockwise at 90 degrees as viewed from above in FIG. 5."

2) "to rotate counterclockwise at 90 degrees" regarding the rotating rods, the pin-holding members, and the pieces, means "to rotate counterclockwise at 90 degrees as viewed from above in FIG. 5."

3) "first pin-holding members" and "second pin-holding members" mean "the pin-holding members held by an upstream-moving beam" and "the pin-holding members held by a downstream-moving beam," respectively. The "first pin-holding members" and the "second pin-holding members" have the same constitution.

Figure 1:
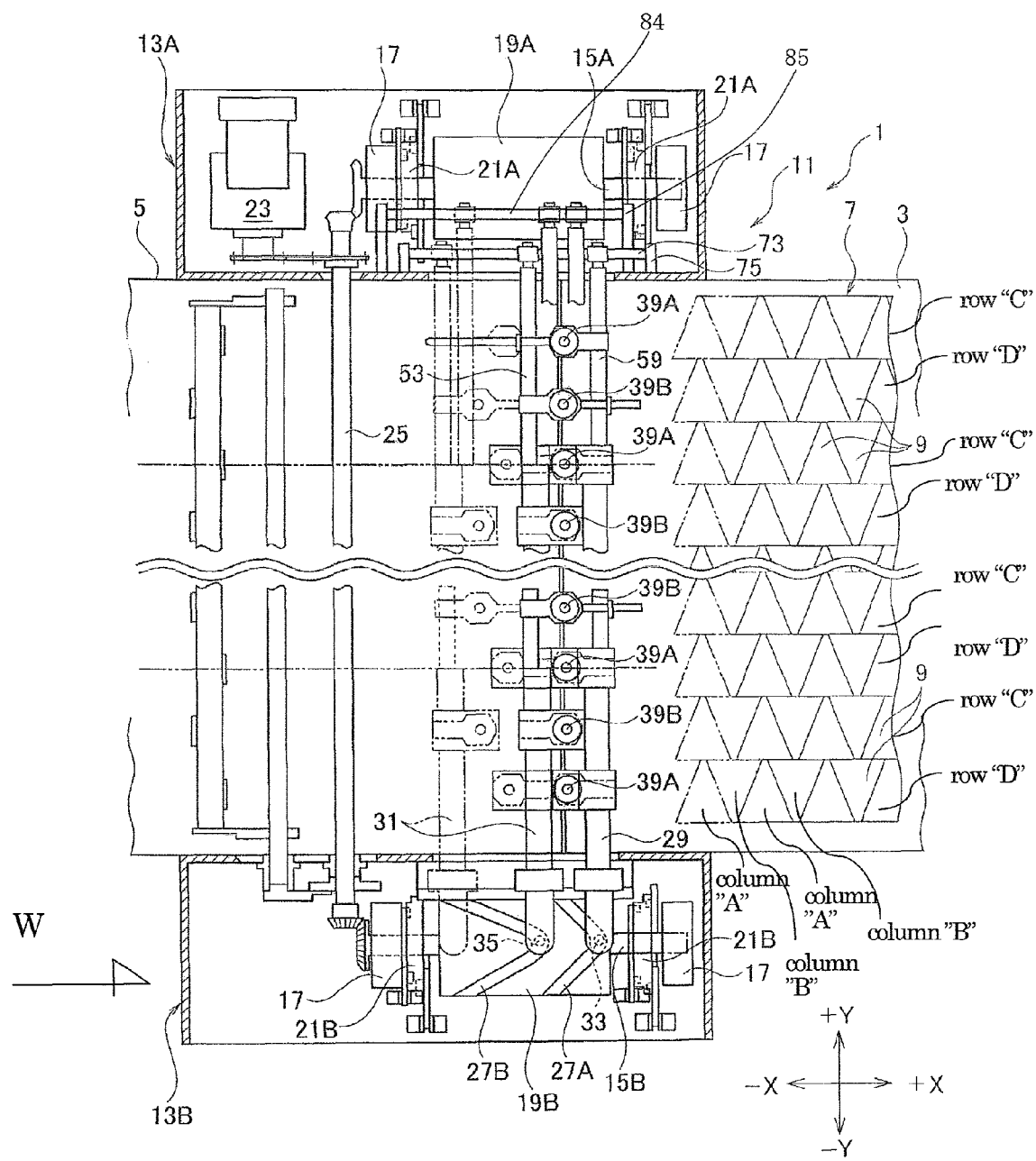
FIG. 1 shows the plane view of the conventional apparatus for spacing and aligning pieces of food dough, which apparatus is disclosed in Patent Document 1.

4) "Upstream" and "downstream" mean "upstream and downstream of the flow of the pieces 9 that are carried by a conveyor." Namely, "upstream" and "downstream" correspond to the directions "+X" and "−X" in FIG. 1, respectively.

5) "an upper end" and "a lower end" of the rotating rods, the pin-holding member, ascending and descending beams, and up-and-down-moving beams, mean "their highest positions in the vertical movements" and "their lowest positions in the vertical movements," respectively.

6) "a position at an upstream end" and "a position at a downstream end" of the pin-holding members mean "the position when the pin-holding members are located at the furthest upstream side (+X side in FIG. 4) of the flow of the pieces 9 that are carried by a conveyor" and "the position when the pin-holding members are located at the furthest downstream side (−X side in FIG. 4) of the flow of the pieces 9 that are carried by a conveyor," respectively.

First, an embodiment regarding the first aspect of the invention is explained.

Figure 8:
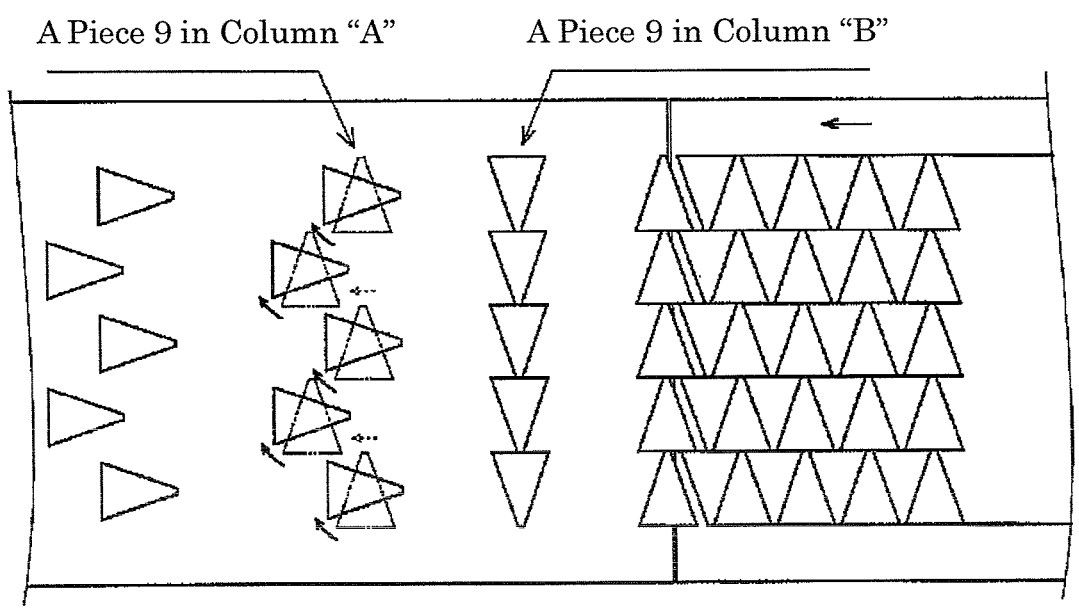
FIG. 8 shows a diagram to explain the procedure for spacing and aligning the pieces by the apparatus for spacing and aligning the pieces of the first and fourth aspect of the invention.

For the apparatus 1A for spacing and aligning pieces of food dough of the first aspect of the invention, as shown in FIG. 8, the triangular-like shaped pieces 9 of food dough, which pieces 9 are cut and separated from a sheet 7 of food dough, are rearranged in a staggered pattern in every column and simultaneously rotated so that one of the apexes of the pieces 9 is oriented toward the upstream direction for carrying the pieces 9.

Figure 4:
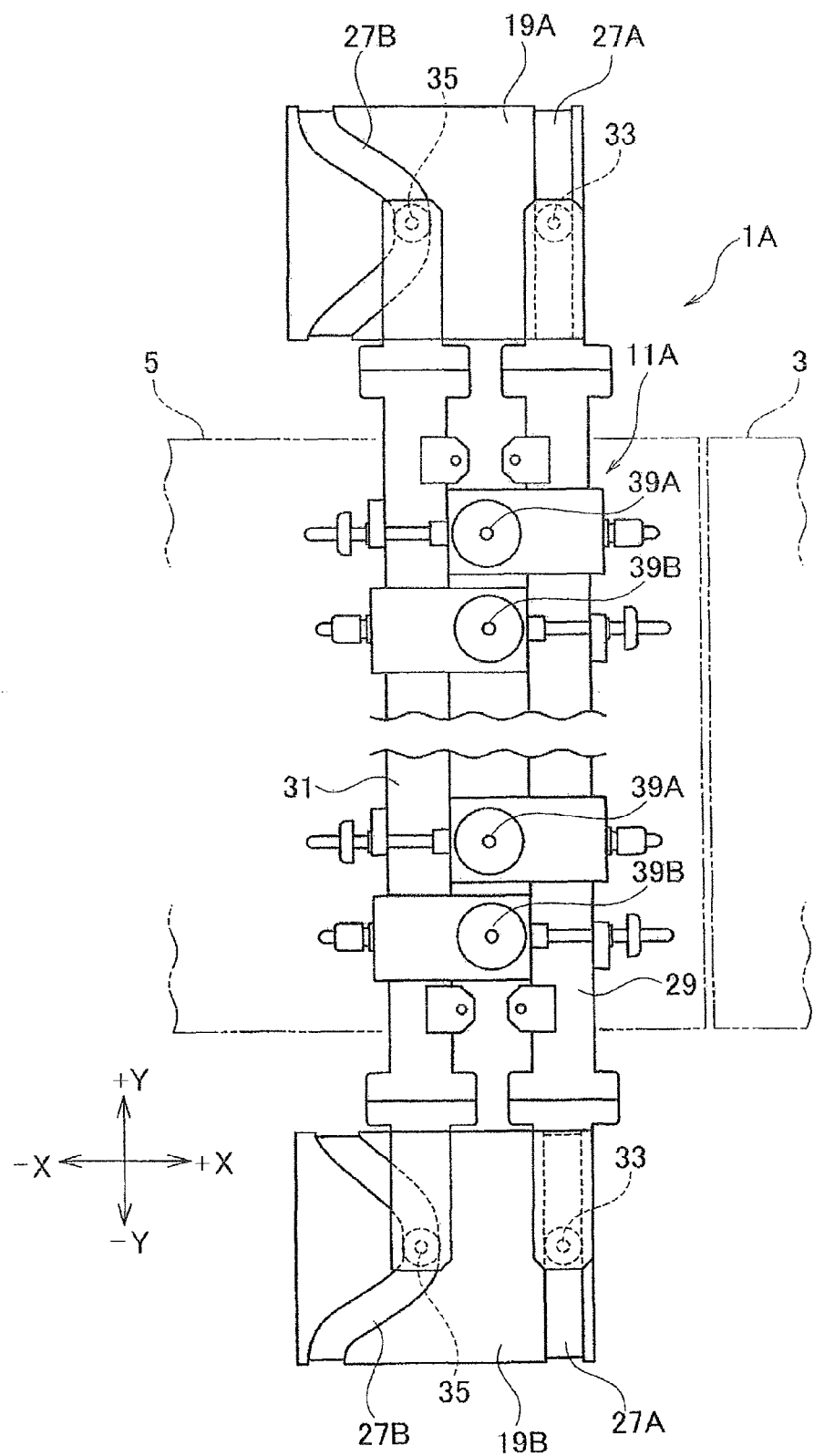
FIG. 4 shows the plane view of the main part of the embodiment of the apparatus for spacing and aligning pieces of food dough of the present inventions.

As shown in FIG. 4, just as with the conventional apparatus 1 for spacing and aligning the pieces of the food dough, which has already been explained, the apparatus 1A of the embodiment of this invention comprises an upstream conveyor 3 and a downstream conveyor 5, which are closely disposed in a line along the direction (direction "X") for carrying the pieces 9. A means 11A for rearranging the pieces in a staggered pattern and rotating the pieces are disposed above the position that is located at the downstream side of the boundary between the upstream conveyor 3 and the downstream conveyor 5.

The means 11A comprises an upstream-moving beam 29 having a plurality of upstream rotating means 39A, which are the same as the upstream rotating means 39A of the conventional apparatus 1, which means 39A have already been explained, and which means 39A are arranged with equal intervals in the direction "Y", and a downstream-moving beam 31 having a plurality of downstream rotating means 39B, which are the same as the downstream rotating means 39B of the conventional apparatus 1, and which means 39B are arranged with equal intervals in the direction "Y"

Cam followers 33, 35, which are disposed at both ends of the upstream and the downstream-moving beam 29, 31 in the direction "Y," are engaged with grooves 27A, 27B, which are formed at the surfaces of cylindrical cams 19A, 19B. For the means 11A for rearranging the pieces in a staggered pattern and rotating the pieces of this embodiment, the upstream-moving beam 29 does not move in the direction for carrying the sheet 7 of the food dough, but is fixed to a predetermined position. In contrast, the downstream-moving beam 31 is reciprocated toward the downstream side. Thus, the groove 27A is formed so as to have an annular shape. The rotations of the cylindrical cams 19A, 19B are synchronized by the same mechanism as that of the conventional apparatus 1 already explained.

The upstream and the downstream rotating means 39A, 39B have structures similar to those of the upstream and the downstream rotating means 39A, 39B of the conventional apparatus 1 already explained. The difference between them is such that the pin-holding members 67 of the downstream rotating means 39A, 39B of this embodiment have a disk-like shape, as shown in FIG. 6. Each of the pin-holding members 67 has a plurality of pins 65. FIG. 6 (a) shows one embodiment of the layout of the pins 65. (FIG. 6 (a) is shown to explain the relationship of the locations of the pins 65, and depicts the pin-holding members 67 with the pins 65 as viewed from above the downstream conveyor 5.) The pin-holding members 67 shown in FIG. 6 (a) have two pairs of pins 65A(1), 65A(2), and 65B(1), 65B(2), which are disposed on orthogonal axes "X1" and "Y1," so as to be located on one circle. ("X1" and "Y1" denote the axes of the coordinates used in FIG. 6, which are just to explain the locations of the pins 65.) Further, a plurality of pins 65 are disposed between the pins 65A(1), 65A(2), 65B(1), and 65B(2), and on an imaginary circle.

FIG. 6 (b) shows the relationship between the locations of the pins 65 of the pin-holding members 67 and the shape of the pieces 9 of the food dough of the columns "A" and "B," when the pin-holding members 67 shown in FIG. 6 (a) are used.

At the state shown by the left drawing of FIG. 6 (b), the pin-holding members 67 stick the pieces 9 of the column "A," then rotate the pieces 9 clockwise at 90 degrees so that one of the apexes of the triangular-like-shaped pieces 9 is oriented toward the upstream side of the direction for carrying the pieces. Next, at the state shown by the right drawing of FIG. 6 (b), the pin-holding members 67 stick the pieces 9 of the column "B," then rotate the pieces 9 counterclockwise at 90 degrees so that one of the apexes of the triangular-like-shaped pieces 9 is oriented toward the upstream side of the direction for carrying the pieces.

Thus, about the pieces 9 of the column "A," at least the pins 65B(1), 65B(2) can stick the pieces 9. In contrast, about the pieces 9 of the column "B," at least the pins 65A(1), 65A(2) can stick the pieces 9. Thus, if the pin-holding members 67 are rotated clockwise at 90 degrees, and then are rotated counterclockwise at 90 degrees, at least two pins 65 can stick the pieces 9 of both columns "A" and "B." Thus, the pieces 9 of both columns "A" and "B" can certainly be rotated.

FIGS. 6 (c), (d), and (e) show other embodiments for the layout of the pins 65 of the pin-holding members 67. FIG. 6(e) shows the embodiment of the pin-holding members 67, of which the pins 65A(1) and 65A(2), and 65B(1) and 65B(2) are unsymmetrically located from the center of rotation. FIG. 6 (d) shows the embodiment of the pin-holding members 67, of which the pins 65A(2) and 65B(2) are located at the center of rotation. FIG. 6(c) shows the embodiment of the pin-holding members 67, of which the pins 65A(1) and 65A(2), and 65B(1) and 65B(2) are located on two lines radially and orthogonally extending from the center of rotation.

The layout of the pins of the pin-holding members 67 is not limited to the layouts explained in this paragraph. The pins may be placed so that at least two pins of a pin-holding member 67 can pick both pieces 9 in the columns "A" and "B," when the pin-holding members 67 descend, and then pick the pieces 9 of the food dough.

At the initial position, the plurality of the upstream and the downstream rotating means 39A, 39B are aligned in the direction "Y." In that state, if the plurality of pieces 9 of the column "A" (corresponding to the column "A" of FIG. 1), which pieces 9 are cut and separated from a sheet of food dough and are aligned in the direction "Y," are carried to the position below the means 11 for rearranging pieces in a staggered pattern and rotating the pieces, the rotating rods 63 descend, and pins 65 of the pin-holding members 67 fixed to the rotating rods 63 pick the pieces 9, just as with the conventional apparatus 1. At that time, the pins that pick the pieces 9 are the pair of pins 65B, which are aligned in the direction "Y," and other pins 65 adjacent to the pins 65B.

When the downstream-moving beam 31 moves toward the downstream side by the rotation of the cylindrical cams 19A, 19B so that the downstream-moving beam 31 separates from the upstream-moving beam 29, namely, when the pieces 9 are rearranged in a staggered pattern, the rotating rods 63 of the upstream and the downstream rotating means 39A, 39B rotate the pieces 9 clockwise at 90 degrees so that one of the apexes of the triangular-like-shaped pieces 9 is oriented toward the upstream side of the direction for carrying the pieces 9, just as with the conventional apparatus 1. Thus, when the rotating rods 63 rotate clockwise at 90 degrees, the pair of pins 65B of the pin-holding members 67, which pins 65B have been located on a line extending in the direction "Y," move so that the pins 65B are located on a line extending in the direction "X," and in contrast, the pair of pins 65A, which has been located on a line extending in the direction "X," move so that the pins 65A are located on a line extending in the direction "Y."

Namely, when the pieces 9 are released from the pins 65 by lifting the rotating rods 63, and the downstream-moving beam 31 returns to the initial position, the pair of pins 65A has moved so that the pins 65A are located on a line extending in the direction "Y." Thus, without further rotating the rotating rods 63 clockwise, the pins 65A and the other pins 65 adjacent to the pins 65A of the pin-holding members 67 can also pick the pieces 9 in column "B" (corresponding to the column "A" of FIG. 1) adjacent to the column "A."

When the downstream-moving beam 31 moves again toward the downstream side, by rotating the rotating rods 63 and the pin-holding members 67 of the upstream and the downstream rotating means 39A, 39B counterclockwise at 90 degrees, the pieces 9 in the column "B" can be aligned so that one of the apexes of the triangular-like-shaped pieces 9 is oriented toward the upstream side of the direction for carrying the pieces 9.

Figure 12:
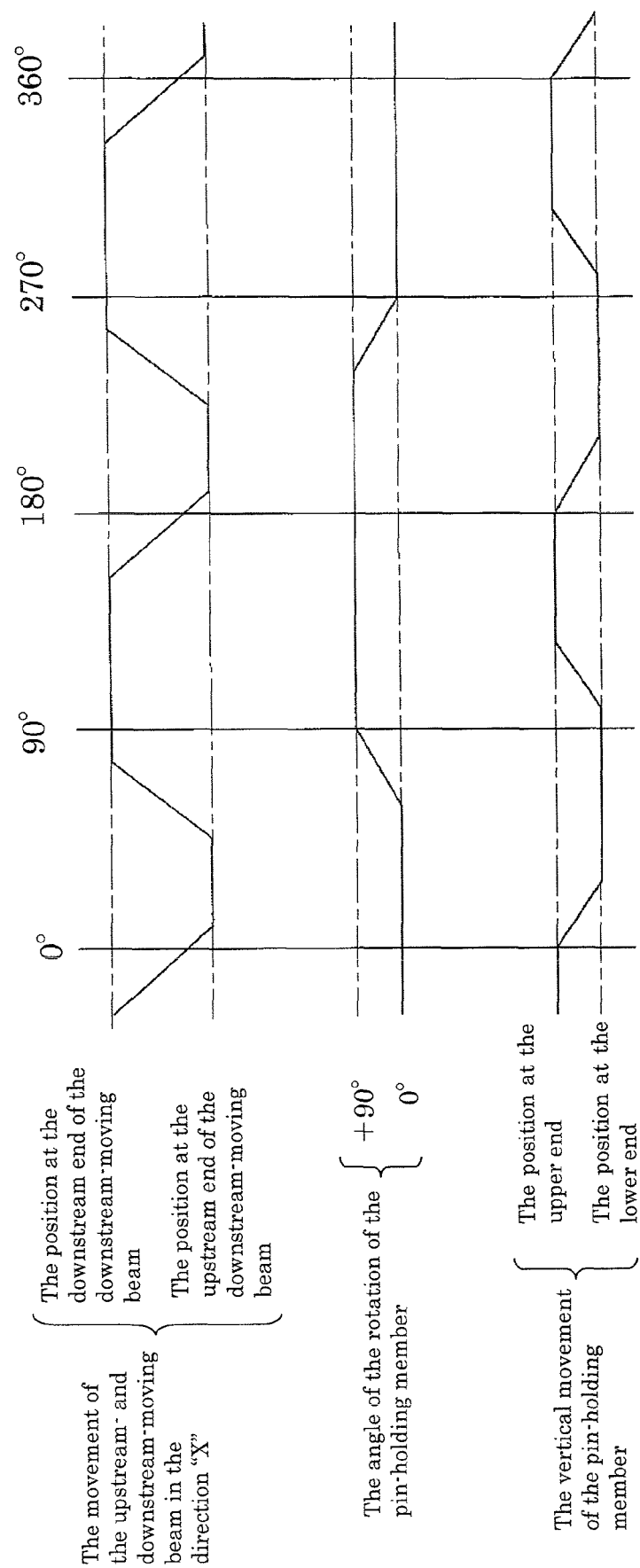
FIG. 12 shows a timing chart for some elements of the apparatus for spacing and aligning the pieces of the first aspect of the invention, which chart explains the movement of the main parts of the apparatus.

Below, the movements of the apparatus 1A of the first aspect of the invention are explained based on FIG. 12. FIG. 12 shows a timing chart for some elements of the apparatus 1A for spacing and aligning the pieces of the first aspect of the invention.

FIG. 12 shows the relationship between the rotational angles of the rotating axes 15A, 15B versus (1) the movement of the downstream-moving beam 31 in the direction "X," (2) the rotational movement of the pin-holding members 67, and (3) the vertical movement of the pin-holding members 67.

Since the upstream-moving beam 29 does not move in the direction for carrying the pieces 9 (direction "X"), FIG. 12 does not contain a line for expressing the movement of the upstream-moving beam 29 in the direction "X."

At the initial position (it corresponds to the state of the cylindrical cams 19A, 19B that are shown in FIG. 4), as shown in FIG. 4, the upstream and the downstream rotating means 39A, 39B are aligned in the direction "Y."

First, by rotating the rotating axes 15A, 15B, the up-and-down-moving beams 71, 71A lower the first and the second pin-holding members 67 to the lower end. Then the downstream-moving beam 31 moves the second pin-holding members 67 from the position at the upstream end to the position at the downstream end. While the second pin-holding members 67 move from the position at the upstream end to the position at the downstream end, the rotating rods 63 rotate the first and the second pin-holding members 67 clockwise at 90 degrees. Next, the up-and-down-moving beams 71, 71A lift the first and the second pin-holding members 67 to the upper end. Next, the downstream-moving beam 31 moves the second pin-holding members 67 from the position at the downstream end to the position at the upstream end. Then, the up-and-down-moving beams 71, 71A lower the first and the second pin-holding members 67 to the lower end. Next, the downstream-moving beam 31 moves the second pin-holding members 67 from the position at the upstream end to the position at the downstream end, and simultaneously the rotating rods 63 rotate the first and the second pin-holding members 67 counterclockwise at 90 degrees. Then, the up-and-down-moving beams 71, 71A lift the first and the second pin-holding members 67 to the upper end. Next, the downstream-moving beam 31 moves the second pin-holding members 67 from the position at the downstream end to the position at the upstream end. By repeatedly performing these operations, the pieces 9 in columns "A" and "B" can be continuously aligned so that one of the apexes of the triangular-like-shaped pieces 9 is oriented toward the same direction.

Incidentally, while the pin-holding members 67 are positioned at the lower end, the pins 65 of the pin-holding members 67 keep sticking the triangular-like-shaped pieces 9.

The clockwise and counterclockwise rotational movements of the rotating rods 63 are achieved by the vertical movements of the ascending and descending beams 53, 59. The ascending and descending beams 53, 59 may move vertically so that the rotating rods 63 can just rotate counterclockwise at 90 degrees, after a clockwise rotation of 90 degrees. Thus, respective grooves that have two portions of semicircular shapes having different radii may be formed at the surfaces of the disk-like cams 21A, 21B to vertically move the ascending and descending beams 53, 59. Namely, each groove has two portions. One portion is for holding the ascending and descending beams 53, 59 at the upper end, and has a semicircular shape having a large radius. The other portion is for holding the ascending and descending beams 53, 59 at the lower end, and has a semicircular shape having a small radius. The two portions of the groove disposed at the surface of the disk-like cam are opposed to each other. Both ends of the two respective portions of the groove are connected by straight grooves inclined to the radial direction, which inclined grooves are for vertically moving the ascending and descending beams 53, 59. Namely, the grooves formed at the surfaces of the disk-like cams 21A, 21B have a simplified shape.

Thus, if the disk-like cams 21A, 21B are rotated at high speed together with the cylindrical cams 19A, 19B, since the number of accelerations and decelerations of the vertical movements of the ascending and descending beams 53, 59 is reduced, the mechanical vibration caused by the vertical movement of the ascending and descending beams 53, 59 can be suppressed.

For this embodiment explained in the above paragraphs, even if the cylindrical cams 19A, 19B rotate, the upstream-moving beam 29 does not move in the direction for carrying the pieces 9 (in the direction "X"), but is fixed to a predetermined position. Namely, only the downstream-moving beam 31 may be reciprocated in the direction for carrying the pieces 9. Thus, no resonance based on the coupling of the movement of the upstream-moving beam 29 and the downstream-moving beam 31 is likely to be caused. Namely, it is possible to reciprocate the downstream-moving beam 31 at high speed.

It is easily understood that the upstream-moving beam 29 can be fixed to the frame 13A, 13B. Thus, for such case, since only the downstream-moving beam 31 may be reciprocated in the direction "X," only the grooves 27B may be formed at the outer surfaces of the cylindrical cams 19A, 19B, and the length of the cylindrical cams 19A, 19B can be shortened and downsized.

Further, when the rotating rods 63 are rotated by means of a linear-motion-type actuator, such as an air cylinder, or a rotary actuator, the rotating rods 63 may be rotated clockwise and counterclockwise only between the positions at "0" and "+90" degrees. Thus, since an undersized actuator can be used for driving the rotating rods 63, it is possible to downsize the actuators and to drive the apparatus 1A at high speed.

When the pins 65 of the pin-holding members 67 fixed to the lower end of the rotating rods 63 pick the pieces aligned in the direction "Y," the upstream and the downstream conveyor 3, 5 may stop momentarily, or may continue to move, wherein the rotating rods 63 are disposed at the upstream and downstream rotating means 39A, 39B and can move vertically and can rotate freely.

As explained in the above paragraphs, the subject articles handled by the apparatus 1A are the pieces 9 that are cut and separated from the sheet 7 of the food dough, and that are arranged in a line along the direction "Y" so as to form the columns "A" and "B." When the pieces 9 are rearranged in a staggered pattern and rotated so that one of the apexes of the triangular-like-shaped pieces 9 is oriented toward the upstream side of the direction for carrying the pieces 9, the upstream-moving beam 29 does not move in the direction for carrying the sheet 7, but is fixed to a predetermined position. Thus, the distance for moving the pieces 9 of the rows "C" can be reduced. Consequently, the distance for moving the pieces 9 of the rows "D" toward the downstream side becomes less than that of the conventional apparatus 1. Thus, the mechanical vibration caused by the apparatus 1A can be suppressed. Further, the apparatus 1A can be driven at high speed.

Next, an embodiment of the second aspect of the invention is explained. For the second aspect of the invention, only the elements that differ from those of the first aspect of the invention are explained.

Figure 9:
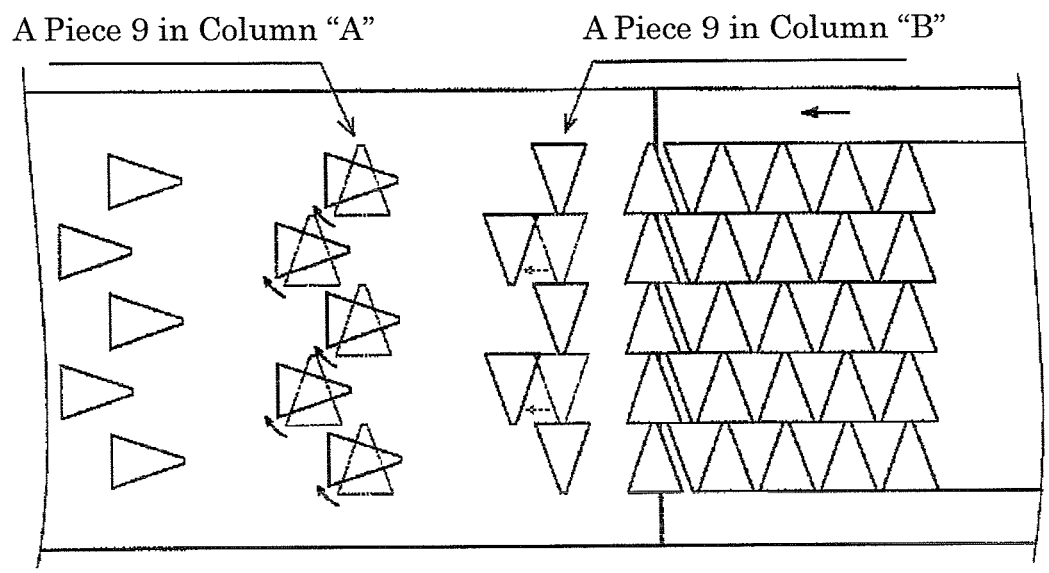
FIG. 9 shows a diagram to explain the procedure for spacing and aligning the pieces by the apparatus for spacing and aligning the pieces of the second aspect of the invention.

For the apparatus 1A for spacing and aligning pieces 9 of food dough of the second aspect of the invention, as shown in FIG. 9, the triangular-like shaped pieces 9 of food dough, which pieces 9 are cut and separated from the sheet 7 of food dough, have been preliminarily rearranged in a staggered pattern in every column, and the pieces 9 are rotated so that one of the apexes of the pieces 9 is oriented toward the upstream direction for carrying the pieces 9.

For the apparatus 1A for spacing and aligning the pieces 9 of food dough of the second aspect of the invention, the apparatus 1A comprises a means 93 for rearranging pieces in a staggered pattern and a means 94 for rotating the pieces 9, instead of the means 11A for rearranging the pieces 9 in a staggered pattern and rotating the pieces 9 of the first aspect of the invention. The means 93 is used for rearranging the triangular-like shaped pieces 9 in a staggered pattern in every column, and is located above the upstream end of the downstream conveyor 5. The means 94 is used for rotating the triangular-like shaped pieces 9 clockwise and counterclockwise at 90 degrees that have been already rearranged in a staggered pattern in every column. The means 93 is located above the downstream conveyor 5 and at the downstream side of the means 93.

The means 93 is constituted by omitting the function for rotating the rotating rods 63 and the pin-holding member 67 from the means 11A for rearranging pieces 9 in a staggered pattern and rotating the pieces 9 of the first aspect of the invention. Thus, the means 93 does not comprise the ascending and descending beams 53, 59 or the hollow rotating shafts 43 of the means 11A of the first aspect of the invention. Further, the pin-holding members 67 of the means 93 do not rotate.

The means 94 is constituted by omitting the function for rearranging the triangular-like shaped pieces 9 in a staggered pattern in every column from the means 11A for rearranging the pieces 9 in a staggered pattern and rotating the pieces 9 of the first aspect of the invention. Thus, the upstream- and the downstream-moving beam 29, 31 do not move in the direction for carrying the sheet 7 of the food dough, but are fixed to a predetermined position. The pin-holding members 67 are fixed to the lower end of the rotating rods 63 so as to be able to move vertically and rotate, and are preliminarily arranged in a staggered pattern. Thus the pin-holding members 67 of the means 94 do not move in the direction for carrying the pieces 9 (in the direction "X").

Figure 13:
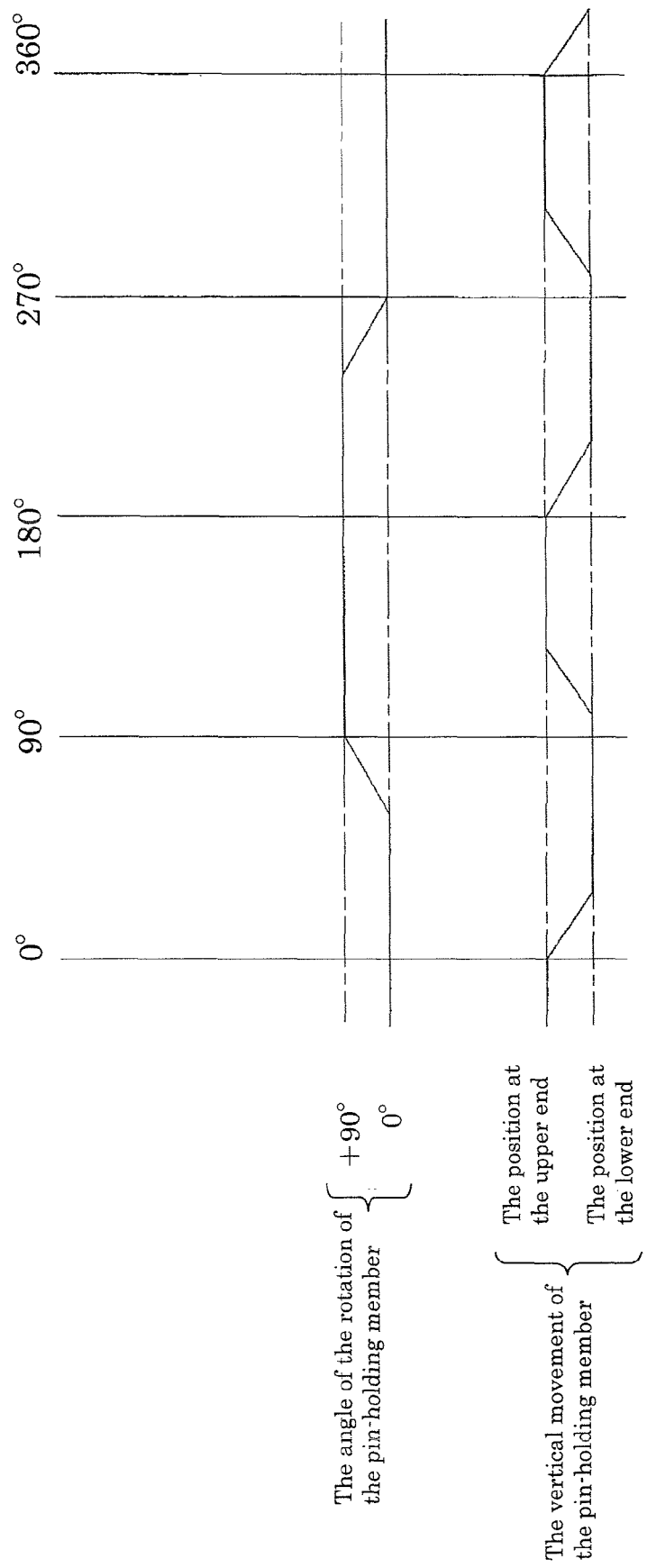
FIG. 13 shows a timing chart for some elements of the apparatus for spacing and aligning the pieces of the second and third aspect of the invention, which chart explains the movement of the main parts of the apparatus.

Next, the movements of the apparatus 1A of the second aspect of the invention are explained based on FIG. 13. FIG. 13 shows a timing chart for some elements of the apparatus 1A for spacing and aligning the pieces of the first aspect of the invention.

FIG. 13 shows the relationship between the rotational angles of the rotating axes 15A, 15B versus (1) the rotational movements of the pin-holding members 67, and (2) the vertical movements of the pin-holding members 67. FIG. 13 does not have lines for showing the movement of the means 93 for rearranging the triangular-like shaped pieces 9 in a staggered pattern in every column. Namely, FIG. 13 shows only the movements of the means 94 for rotating the pieces 9. The plurality of pin-holding members 67 of the means 94 has been preliminarily rearranged in a staggered pattern.

First, by rotating the rotating axes 15A, 15B, the up-and-down-moving beams 71, 71A lower the pin-holding members 67 to the lower end. Then, the rotating rods 63 rotate the pin-holding members 67 clockwise at 90 degrees. Next, the up-and-down-moving beams 71, 71A lift the pin-holding members 67 to the upper end. Then, the up-and-down-moving beams 71, 71A again lower the pin-holding members 67 to the lower end. Next, the rotating rods 63 rotate the pin-holding members 67 counterclockwise at 90 degrees. Then, the up-and-down-moving beams 71, 71A lift the pin-holding members 67 to the upper end. By repeatedly performing these operations, the triangular-like-shaped pieces 9 that have been preliminarily rearranged in a staggered pattern can be continuously aligned so that the pieces 9 are oriented toward the same direction.

Incidentally, while the pin-holding members 67 are positioned at the lower end, the pins 65 of the pin-holding members 67 keep sticking the triangular-like-shaped pieces 9.

Next, an embodiment of the third aspect of the invention is explained. For the third aspect of the invention, only the elements that differ from those of the first aspect of the invention are explained.

Figure 10:
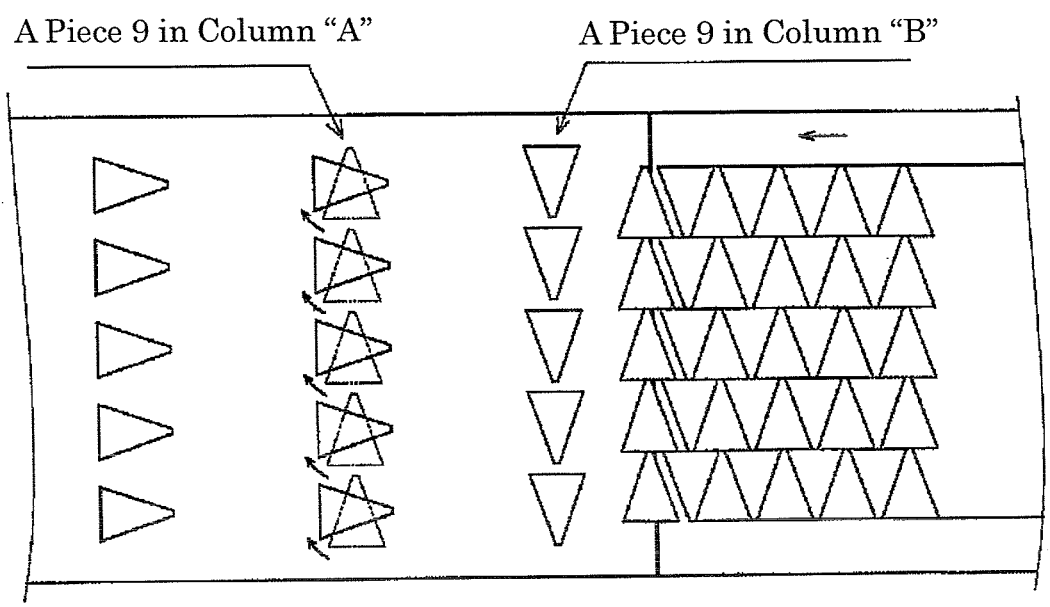
FIG. 10 shows a diagram to explain the procedure for spacing and aligning the pieces by the apparatus for spacing and aligning the pieces of the third aspect of the invention.
Figure 11:
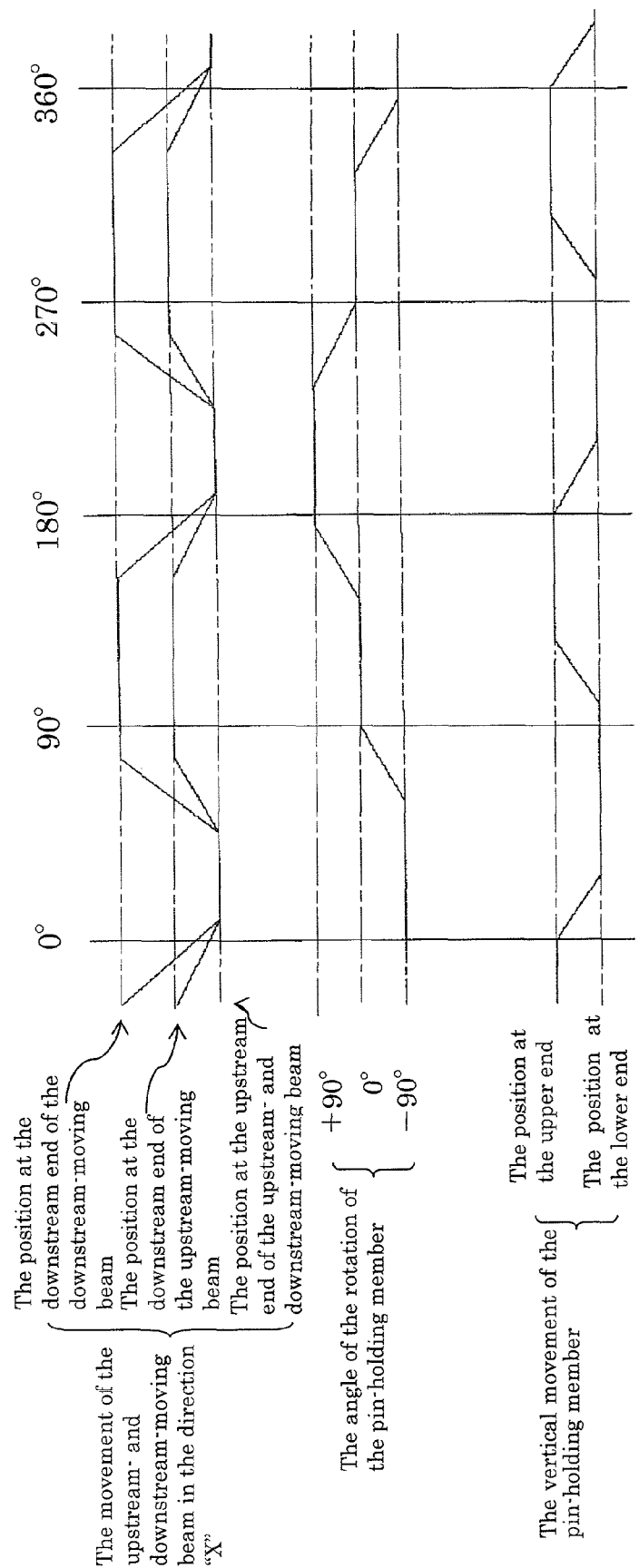
FIG. 11 shows a timing chart for some elements of the conventional apparatus for spacing and aligning the pieces as in Patent Document 1, which chart explains the movement of the main parts of the apparatus.

For the apparatus 1A for spacing and aligning pieces 9 of food dough of the third aspect of the invention, as shown in FIG. 10, the triangular-like shaped pieces 9 of food dough have been cut and separated from the sheet 7 of food dough, and have been preliminarily separated from each other in the traverse direction (direction "Y" of FIG. 10) of the downstream conveyor 5. Then, the pieces 9 are rotated so that one of the apexes of the pieces 9 is oriented toward the upstream direction for carrying the pieces 9.

Thus, for the apparatus 1A for spacing and aligning the pieces 9 of the food dough of the third aspect of the invention, the apparatus 1A comprises a means 97 for separating the pieces 9 in a traverse direction and a means 98 for rotating the pieces 9, instead of the means 11A for rearranging the pieces 9 in a staggered pattern and rotating the pieces 9.

The means 97 is used for separating the pieces 9 in a traverse direction to extend the intervals between the pieces 9, and is located above the upstream end of the downstream conveyor 5.

The means 98 is used for rotating the triangular-like shaped pieces 9 that have been already separated in the traverse direction of the downstream conveyor 5 and rearranged in every column, clockwise and counterclockwise at 90 degrees. The means 98 is located above the downstream conveyor 5, and at the downstream side of the means 97.

As the means 97 for separating the pieces 9 in a traverse direction, for example, the device for extending the intervals between the pieces 9 of food dough, which device is disclosed in Japanese Patent No. 1343038, and which device uses a pantagraph-like linkage mechanism, may be used. Namely, by fixing the pin-holding members 67 that are used in the means 93 for rearranging pieces in a staggered pattern of the second aspect of the invention, to the nodes of the pantagraph-like linkage mechanism, and by attaching the device for extending the intervals between the pieces 9 of food dough, to the element like the up-and-down-moving beams 71, 71A, the means 97 for separating the pieces 9 in a traverse direction can be constituted. Thus, the pin-holding members 67 of the means 97 can move vertically and in the traverse direction, but do not rotate.

The means 98 for rotating the pieces 9 are similar to the means 94 for rotating the pieces 9 of the second aspect of the invention. For the means 94 of the second aspect of the invention, the plurality of pin-holding members 67 are preliminarily arranged in a staggered pattern. In contrast, for the means 98 of the third aspect of the invention, the plurality of pin-holding members 67 are preliminarily arranged in a line so as to be separated in the traverse direction of the downstream conveyor 5. Each of the plurality of pin-holding members 67 is fixed to the lower end of the rotating rods 63 so as to be able to move vertically and rotate. The pin-holding members 67 of the means 98 of the third aspect of the invention do not move in the direction for carrying the pieces 9 (in the direction "X"), just as with those of the second aspect of the invention.

The timing chart for the apparatus 1A for spacing and aligning the pieces of the third aspect of the invention is the same as that of the second aspect of the invention (FIG. 13). Thus, the explanation of the timing chart of the apparatus 1A of the third aspect of the invention is omitted.

Next, an embodiment of the fourth aspect of the invention is explained. For the fourth aspect of the invention, only the elements that differ from those of the first aspect of the invention are explained.

For the apparatus 1A for spacing and aligning pieces of food dough of the fourth aspect of the invention, as shown in FIG. 8, the triangular-like shaped pieces 9 of food dough, which pieces 9 are cut and separated from a sheet 7 of food dough, are also rearranged in a staggered pattern in every column and simultaneously rotated so that one of the apexes of the pieces 9 is oriented toward the upstream direction for carrying the pieces 9, just as with the apparatus 1A of the first aspect of the invention.

For the embodiment of the fourth aspect of the invention, cam followers 33, 35, which are disposed at both ends of the upstream and the downstream-moving beam 29, 31 in the direction "Y," are engaged with grooves 27A, 27B, which are formed at the surfaces of the cylindrical cams 19A, 19B shown in FIG. 1. For the means 11A for rearranging the pieces in a staggered pattern and rotating the pieces of the embodiment of the first aspect of the invention, the upstream-moving beam 29 does not move in the direction for carrying the sheet 7 of the food dough, but is fixed to a predetermined position, and only the downstream-moving beam 31 is reciprocated toward the downstream side.

However, for the means 11A for rearranging the pieces in a staggered pattern and rotating the pieces of the embodiment of the fourth aspect of the invention, not only the downstream-moving beam 31, but also the upstream-moving beam 29, move in the direction for carrying the sheet 7 of the food dough.

For this embodiment, the cylindrical cams 19A, 19B of the conventional apparatus 1, which are shown in FIG. 1 and are explained as prior art, can be used. The cylindrical cams 19A, 19B have grooves 27A, 27B at their peripheral surfaces, which grooves 27A, 27B (not shown in the cylindrical cam 19A) substantially form a W-like shape (if the cylindrical cams were to be unrolled) having a coinciding phase. Incidentally, for the grooves 27A, 27B of the cylindrical cams 19A, 19B, the strokes in the direction "X" of the grooves 27A disposed at the upstream side (the direction "+X" in FIG. 1) of the cylindrical cams 19A, 19B are less than those of the grooves 27B disposed at the downstream side (the direction "−X" in FIG. 1) of the cylindrical cams 19A, 19B.

Thus, the cam followers 33, 35 that are engaged with the grooves 27A, 27B of the cylindrical cams 19A, 19B, respectively, make two round trips while the cylindrical cams 19A, 19B are rotated one revolution. Further, the strokes of the cam followers 35 in the direction "X," which followers 35 are engaged with the grooves 27B located at the downstream side, are greater than that of the cam followers 33 in the direction "X," which followers 33 are engaged with the grooves 27A located at the upstream side.

Except for those points explained in the above paragraphs, there is no difference between the embodiment of the fourth aspect of the invention and that of the first aspect of the invention.

Figure 14:
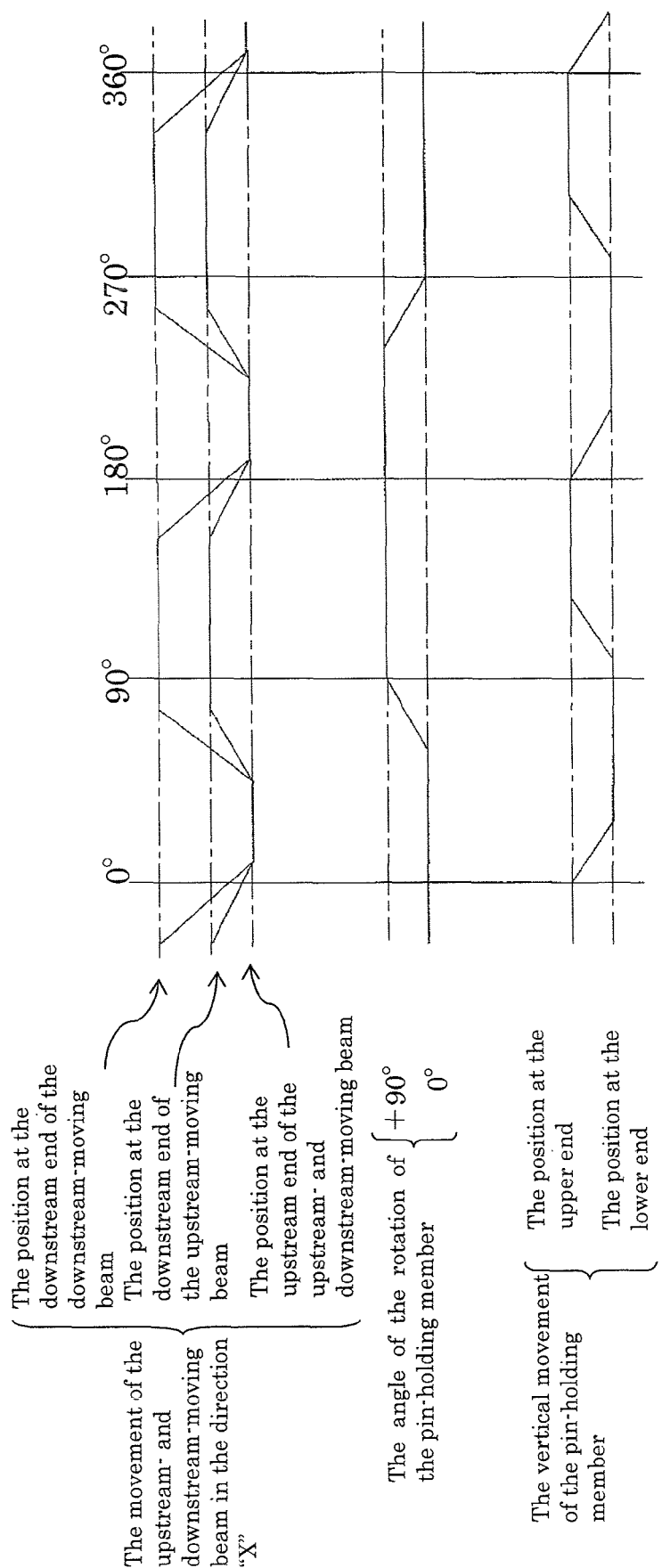
FIG. 14 shows a timing chart for some elements of the apparatus for spacing and aligning the pieces of the fourth aspect of the invention, which chart explains the movement of the main parts of the apparatus.

Below, the movements of the apparatus 1A of the fourth aspect of the invention are explained based on FIG. 14. FIG. 14 shows a timing chart for some elements of the apparatus 1A for spacing and aligning the pieces of the fourth aspect of the invention.

FIG. 14 shows the relationship between the rotational angles of the rotating axes 15A, 15B versus (1) the movement of the upstream-moving beam 29 in the direction "X," (2) the movement of the downstream-moving beam 31 in the direction "X," (3) the rotational movements of the pin-holding members 67, and (4) the vertical movements of the pin-holding members 67.

At the initial position (it corresponds to the state of the cylindrical cams 19A, 19B that are shown in FIG. 1), as shown in FIG. 1, the upstream and the downstream rotating means 39A, 39B are aligned in the direction "Y"

First, by rotating the rotating axes 15A, 15B, the up-and-down-moving beams 71, 71A lower the first and the second pin-holding members 67 to the lower end. Then the downstream-moving beam 31 moves the second pin-holding members 67 from the position at the upstream end to the position at the downstream end. Simultaneously, the upstream-moving beam 31 moves the first pin-holding members 67 from the position at the upstream end to the position at the downstream end.

Then, since the inclination of the grooves 27A differs from that of the grooves 27B, the downstream-moving beam 31 moves downstream faster than the upstream-moving beam 29. Namely, as shown in FIG. 14, the stroke of the movement of the downstream-moving beam 31 in the direction "X" is greater than that of the upstream-moving beam 29. Thus, the pieces 9 of the food dough that are aligned in the direction "Y" are placed on the downstream conveyor 5 in a staggered pattern.

While the first and the second pin-holding members 67 move from the position at the upstream end to the position at the downstream end by the upstream° and the downstream-moving beam 29, 31, the rotating rods 63 rotate the first and the second pin-holding members 67 clockwise at 90 degrees. Next, the up-and-down-moving beams 71, 71A lift the first and the second pin-holding members 67 to the upper end. Next, the upstream- and the downstream-moving beam 29, 31 move the first and the second pin-holding members 67 from the position at the downstream end to the position at the upstream end, respectively. Then, the up-and-down-moving beams 71, 71A lower the first and the second pin-holding members 67 to the lower end. Next, the upstream- and the downstream-moving beam 29, 31 move the first and the second pin-holding members 67 from the position at the upstream end to the position at the downstream end, respectively. Simultaneously the rotating rods 63 rotate the first and the second pin-holding members 67 counterclockwise at 90 degrees. Then, the up-and-down-moving beams 71, 71A lift the first and the second pin-holding members 67 to the upper end. Next, the upstream- and the downstream-moving beam 29, 31 move the first and the second pin-holding members 67 from the position at the downstream end to the position at the upstream end, respectively. By repeatedly performing these operations, the pieces 9 in columns "A" and "B" can be continuously aligned so that one of the apexes of the triangular-like-shaped pieces 9 is oriented toward the same direction.

EXPLANATION OF DENOTATIONS

1, 1A an apparatus for spacing and aligning pieces of food dough
3 an upstream conveyor
5 a downstream conveyor
7 a sheet of food dough
9 pieces of food dough
11, 11A a means for rearranging pieces in a staggered pattern and rotating the pieces
13A, 13B a frame
15A, 15B a rotating axis
19A, 19B a cylindrical cam
21A, 21B a disk-like cam
23 a motor
25 an intermediate shaft
27A, 27B a groove
29 an upstream-moving beam
31 a downstream-moving beam
33, 35 a cam follower
37A, 37B a guiding member
39A an upstream rotating means
39B a downstream rotating means
41 a supporting bracket
43 a hollow rotating shaft
45 a bracket
47 an ejector plate
49 a male thread
51 a screw member
53, 59 an ascending and descending beam
55 a supporting member
57 a rod
63 a rotating rod
65 pins
67 a pin-holding member
69 an ascending and descending member
71, 71A an up-and-down-moving beam
73 a supporting shaft
75 an ascending and descending bracket
77 a swinging link
79 a protruding member
81 a swinging arm
83 a cam follower
84 a supporting shaft
85 an ascending and descending bracket
87 a swinging link
89 a protruding member
91 a cam follower
93 a means for rearranging the pieces in a staggered pattern
94 a means for rotating the pieces
97 a means for separating the pieces in a traverse direction
98 a means for rotating the pieces

What we claim is:

1. An apparatus for spacing and aligning triangular-like shaped pieces of food dough in one direction, which pieces are cut and separated from a sheet of food dough so as to form columns, which columns are carried sequentially downstream from upstream by a conveyor, wherein the directions of the pieces of the adjacent columns are alternately opposite each other, the apparatus comprising:

a plurality of first pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in a first direction when the first pin-holding member is in the position at 0 degrees, and such that a second subset of at least two of the plurality of pins are positioned for sticking a column of pieces having an apex pointing in a second direction opposite to the first direction when the first pin-holding member is in the position at 90 degrees, a plurality of second pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in the first direction when the second pin-holding member is in the position at 0 degrees, and such that a second subset of at least two of the plurality of pins are positioned for sticking a column of pieces having an apex pointing in the second direction opposite to the first direction when the second pin-holding member is in the position at 90 degrees, an upstream-moving beam for holding and fixing the first pin-holding members at predetermined positions in the direction of the movement of the conveyor, a downstream-moving beam for holding and moving the second pin-holding members downstream from upstream, ascending and descending beams for vertically moving the first and the second pin-holding members, and rotating rods for rotating the first and the second pin-holding members between the position at 0 degrees and the position at 90 degrees, wherein (1) the ascending and descending beams lower the first and the second pin-holding members to a position at a lower end, (2) next, the downstream-moving beam moves the second pin-holding members from a position at an upstream end to a position at a downstream end, (3) while in operation (2), the rotating rods rotate the first and the second pin-holding members clockwise at 90 degrees from the position at 0 degrees to the position at 90 degrees, (4) next, the ascending and descending beams lift the first and the second pin-holding members up to a position at an upper end, (5) next, the downstream-moving beam moves the second pin-holding members from the position at the downstream end to the position at the upstream end, (6) next, the ascending and descending beams lower the first and the second pin-holding members to the position at the lower end, (7) next, the downstream-moving beam moves the second pin-holding members from the position at the upstream end to the position at the downstream end,
(8) while in operation (7), the rotating rods rotate the first and the second pin-holding members counterclockwise at 90 degrees from the position at 90 degrees to the position at 0 degrees,
(9) next, the ascending and descending beams lift the first and the second pin-holding members up to the position at the upper end, and
(10) next, the downstream-moving beam moves the second pin-holding members from the position at the downstream end to the position at the upstream end, and,
further, wherein operations (1)-(10) are repeatedly performed.

2. The apparatus for spacing and aligning the triangular-like shaped pieces of food dough of claim 1, further comprising:
an upstream conveyor and a downstream conveyor.

3. The apparatus for spacing and aligning the triangular-like shaped pieces of food dough of claim 1, wherein the respective pins of the plurality of first pin-holding members and the plurality of second pin-holding members are located on two lines radially and orthogonally extending from a center of rotation.

4. The apparatus for spacing and aligning the triangular-like shaped pieces of food dough of claim 2, wherein the respective pins of the plurality of first pin-holding members and the plurality of second pin-holding members are located on two lines radially and orthogonally extending from a center of rotation.

5. An apparatus for spacing and aligning triangular-like shaped pieces of food dough in one direction, which pieces are cut and separated from a sheet of food dough so as to form columns, which columns are carried sequentially downstream from upstream by a conveyor, wherein the directions of the pieces of the adjacent columns are alternately opposite each other,
the apparatus comprising: a means for rearranging pieces in a staggered pattern and a means for rotating the pieces,
the means for rearranging the pieces in a staggered pattern comprising:
a plurality of first pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in a first direction when the first pin-holding member is in the position at 0 degrees, and such that a second subset of at least two of the plurality of pins are positioned for sticking a column of pieces having an apex pointing in a second direction opposite to the first direction when the first pin-holding member is in the position at 90 degrees,
a plurality of second pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in the first direction when the second pin-holding member is in the position at 0 degrees, and such that a second subset of at least two of the plurality of pins are positioned for sticking a column of pieces having an apex pointing in the second direction opposite to the first direction when the second pin-holding member is in the position at 90 degrees,
an upstream-moving beam for holding and fixing the first pin-holding members at the predetermined positions in the direction of the movement of the conveyor,
a downstream-moving beam for holding and moving the second pin-holding members downstream from upstream, and
ascending and descending beams for vertically moving the first and the second pin-holding members,
wherein
(1) the ascending and descending beams lower the first and the second pin-holding members to a position at a lower end,
(2) next, the downstream-moving beam moves the second pin-holding members from a position at an upstream end to a position at a downstream end,
(3) next, the ascending and descending beams lift the first and the second pin-holding members up to a position at an upper end, and
(4) next, the downstream-moving beam moves the second pin-holding members from the position at the downstream end to the position at the upstream end,
further, wherein operations (1)-(4) are repeatedly performed, and
the means for rotating the pieces comprising:
a plurality of pin-holding members having a plurality of pins for sticking the pieces, and which members are preliminarily placed in a staggered pattern,
ascending and descending beams for vertically moving the pin-holding members, and
rotating rods for rotating the pin-holding members between the position at 0 degrees and the position at 90 degrees,
wherein
(1) the ascending and descending beams lower the pin-holding members to a position at a lower end,
(2) next, the rotating rods rotate the pin-holding members clockwise at 90 degrees from the position at 0 degrees to the position at 90 degrees,
(3) next, the ascending and descending beams lift the pin-holding members up to a position at an upper end,
(4) next, the ascending and descending beams lower the pin-holding members to the position at the lower end,
(5) next, the rotating rods rotate the pin-holding members counterclockwise at 90 degrees from the position at 90 degrees and the position at 0 degrees, and
(6) next, the ascending and descending beams lift the pin-holding members up to the position at the upper end, and,
further, wherein operations (1)-(6) are repeatedly performed.

6. An apparatus for spacing and aligning triangular-like shaped pieces of food dough in one direction, which pieces are cut and separated from a sheet of food dough so as to form columns, which columns are carried sequentially downstream from upstream by a conveyor, wherein the directions of the pieces of the adjacent columns are alternately opposite each other,
the apparatus comprising:
a plurality of first pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in a first direction when the first pin-holding member is in the position at 0 degrees, and such that a second subset of at least two of the plurality of pins are positioned for sticking a column of pieces having an apex pointing in a second direction opposite to the first direction when the first pin-holding member is in the position at 90 degrees, a plurality of second pin-holding members that rotate between a position at 0 degrees and a position at 90 degrees, have a plurality of pins for sticking the pieces, and wherein the plurality of pins are geometrically arranged such that a first subset of at least two of the plurality of pins are positioned for sticking a column of pieces having an apex pointing in the first direction when the second pin-holding member is in the position at 0 degrees, and such that a second subset of at least two of the plurality of pins are positioned for sticking a column of pieces having an apex pointing in the second direction opposite to the first direction when the second pin-holding member is in the position at 90 degrees, an upstream-moving beam for holding and moving the first pin-holding members downstream from upstream, a downstream-moving beam for holding and moving the second pin-holding members downstream from upstream, ascending and descending beams for vertically moving the first and the second pin-holding members, and rotating rods for rotating the first and the second pin-holding members between the position at 0 degrees and the position at 90 degrees, wherein (1) the ascending and descending beams lower the first and the second pin-holding members to a position at a lower end, (2) next, the upstream-moving beam moves the first pin-holding members from a position at an upstream end to a position at a downstream end, and simultaneously the downstream-moving beam moves the second pin-holding members from a position at an upstream end to a position at a downstream end, (3) while in operation (2), the rotating rods rotate the first and the second pin-holding members clockwise at 90 degrees from the position at 0 degrees to the position at 90 degrees, (4) next, the ascending and descending beams lift the first and the second pin-holding members up to a position at an upper end, (5) next, the upstream-moving beam moves the first pin-holding members from the position at the downstream end to the position at the upstream end, and simultaneously the downstream-moving beam moves the second pin-holding members from the position at the downstream end to the position at the upstream end, (6) next, the ascending and descending beams lower the first and the second pin-holding members to the position at the lower end, (7) next, the upstream-moving beam moves the first pin-holding members from the position at the upstream end to the position at the downstream end, and simultaneously the downstream-moving beam moves the second pin-holding members from the position at the upstream end to the position at the downstream end, (8) while in operation (7), the rotating rods rotate the first and the second pin-holding members counterclockwise at 90 degrees from the position at 90 degrees to the position at 0 degrees, (9) next, the ascending and descending beams lift the first and the second pin-holding members up to the position at the upper end, and

(10) next, the upstream-moving beam moves the first pin-holding members from the position at the downstream end to the position at the upstream end, and simultaneously the downstream-moving beam moves the second pin-holding members from the position at the downstream end to the position at the upstream end, and, further, wherein operations (1)-(10) are repeatedly performed.

* * * * *